(12) United States Patent
Kimoto

(10) Patent No.: US 11,555,803 B2
(45) Date of Patent: Jan. 17, 2023

(54) CHROMATOGRAPH DATA PROCESSOR AND AUTOMATIC SAMPLE INJECTOR

(71) Applicant: SHIMADZU CORPORATION, Kyoto (JP)

(72) Inventor: Yasuhiro Kimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 262 days.

(21) Appl. No.: 16/883,276

(22) Filed: May 26, 2020

(65) Prior Publication Data

US 2021/0010981 A1    Jan. 14, 2021

(30) Foreign Application Priority Data

Jul. 9, 2019  (JP) .............................. JP2019-127901

(51) Int. Cl.
  *G01N 30/24*  (2006.01)
  *G01N 35/00*  (2006.01)
  *G01N 30/02*  (2006.01)

(52) U.S. Cl.
  CPC ....... *G01N 30/24* (2013.01); *G01N 35/00732* (2013.01); *G01N 2030/025* (2013.01)

(58) Field of Classification Search
  CPC ............ G01N 30/24; G01N 35/00732; G01N 2030/025; G01N 30/02; G01N 30/16; G01N 30/18; G01N 30/20; G01N 2030/16
  USPC ............. 73/23.41, 1.03, 23.35, 23.36, 23.42, 73/61.52, 61.55, 61.56, 61.59, 864.21; 422/70, 89, 63, 67; 702/23–25, 104; 210/656, 198.2; 96/101, 103; 95/82
  See application file for complete search history.

(56) References Cited

U.S. PATENT DOCUMENTS

2018/0156761 A1    6/2018  Yamamoto

FOREIGN PATENT DOCUMENTS

| WO | 2015132909 | * | 9/2015 |
| WO | 2016/017291 A1 | | 2/2016 |
| WO | 2016/189668 A1 | | 12/2016 |

OTHER PUBLICATIONS

Office Action dated Nov. 8, 2022 issued by the Chinese Patent Office in Chinese Application No. 202010656024.8.

* cited by examiner

*Primary Examiner* — Robert R Raevis
(74) *Attorney, Agent, or Firm* — Sughrue Mion, PLLC

(57) ABSTRACT

First analysis information including at least one of a sample analysis condition, a sample preparation condition and a kind of sample is assigned to at least one kind of jig, and the jig is arrangeable to correspond to any of a plurality of sample holders. Holding information representing whether a sample is held by each sample holder and jig information for identifying the kind of jig are acquired by a first information acquirer from an automatic sample injector. The first analysis information in regard to a corresponding sample holder is specified by a first analysis information specifier based on jig information. A batch file for controlling a sequence of analysis or preparation in regard to a sample held by a sample holder corresponding to a jig is created by a batch file creator with use of the holding information and the first analysis information.

10 Claims, 18 Drawing Sheets

FIG. 8

TRAY ID : TRAYRED

| INJECTION AMOUNT | 1 UNIT |
|---|---|
| ANALYSIS LINE | LINE 1 |
| ANALYSIS METHOD | METHOD A |
| OUTPUT FORMAT | FORMAT A |

FIG. 9

TRAY ID : TRAYGREEN

| INJECTION AMOUNT | 3 UNITS |
|---|---|
| ANALYSIS LINE | LINE 1 |
| ANALYSIS METHOD | METHOD B |
| OUTPUT FORMAT | FORMAT B |

FIG. 10

TRAY ID : TRAYBLUE

| INJECTION AMOUNT | 2 UNITS |
|---|---|
| ANALYSIS LINE | LINE 2 |
| ANALYSIS METHOD | METHOD C |
| OUTPUT FORMAT | FORMAT C |

FIG. 12

|  | TRAY ID |
|---|---|
| FIRST PLACEMENT UNIT | TRAYRED |
| SECOND PLACEMENT UNIT | TRAYGREEN |
| THIRD PLACEMENT UNIT | TRAYBLUE |

FIG. 13

| FIRST PLACEMENT UNIT | HOLDING INFORMATION | JIG INFORMATION |
|---|---|---|
| FIRST CONTAINER HOLDER | PRESENT | FIRST HEIGHT |
| SECOND CONTAINER HOLDER | PRESENT | SECOND HEIGHT |
| THIRD CONTAINER HOLDER | PRESENT | THIRD HEIGHT |
| FOURTH CONTAINER HOLDER | ABSENT | — |
| FIFTH CONTAINER HOLDER | ABSENT | — |
| SIXTH CONTAINER HOLDER | PRESENT | REFERENCE HEIGHT |
| SEVENTH CONTAINER HOLDER | PRESENT | REFERENCE HEIGHT |
| EIGHTH CONTAINER HOLDER | PRESENT | REFERENCE HEIGHT |
| NINTH CONTAINER HOLDER | ABSENT | — |
| TENTH CONTAINER HOLDER | PRESENT | FOURTH HEIGHT |
| ELEVENTH CONTAINER HOLDER | ABSENT | — |
| TWELFTH CONTAINER HOLDER | ABSENT | — |
| THIRTEENTH CONTAINER HOLDER | ABSENT | — |
| FOURTEENTH CONTAINER HOLDER | ABSENT | — |
| FIFTEENTH CONTAINER HOLDER | ABSENT | — |
| SIXTEENTH CONTAINER HOLDER | ABSENT | — |
| SEVENTEENTH CONTAINER HOLDER | ABSENT | — |
| EIGHTEENTH CONTAINER HOLDER | ABSENT | — |
| NINETEENTH CONTAINER HOLDER | ABSENT | — |
| TWENTIETH CONTAINER HOLDER | ABSENT | — |

FIG. 14

| SECOND PLACEMENT UNIT | HOLDING INFORMATION | JIG INFORMATION |
|---|---|---|
| FIRST CONTAINER HOLDER | PRESENT | REFERENCE HEIGHT |
| SECOND CONTAINER HOLDER | PRESENT | REFERENCE HEIGHT |
| THIRD CONTAINER HOLDER | PRESENT | REFERENCE HEIGHT |
| FOURTH CONTAINER HOLDER | ABSENT | — |
| FIFTH CONTAINER HOLDER | ABSENT | — |
| SIXTH CONTAINER HOLDER | ABSENT | — |
| SEVENTH CONTAINER HOLDER | ABSENT | — |
| EIGHTH CONTAINER HOLDER | ABSENT | — |
| NINTH CONTAINER HOLDER | ABSENT | — |
| TENTH CONTAINER HOLDER | ABSENT | — |
| ELEVENTH CONTAINER HOLDER | ABSENT | — |
| TWELFTH CONTAINER HOLDER | ABSENT | — |
| THIRTEENTH CONTAINER HOLDER | ABSENT | — |
| FOURTEENTH CONTAINER HOLDER | ABSENT | — |
| FIFTEENTH CONTAINER HOLDER | ABSENT | — |
| SIXTEENTH CONTAINER HOLDER | ABSENT | — |
| SEVENTEENTH CONTAINER HOLDER | ABSENT | — |
| EIGHTEENTH CONTAINER HOLDER | ABSENT | — |
| NINETEENTH CONTAINER HOLDER | ABSENT | — |
| TWENTIETH CONTAINER HOLDER | ABSENT | — |

F I G. 1 5

| THIRD PLACEMENT UNIT | HOLDING INFORMATION | JIG INFORMATION |
|---|---|---|
| FIRST CONTAINER HOLDER | ABSENT | — |
| SECOND CONTAINER HOLDER | ABSENT | — |
| THIRD CONTAINER HOLDER | ABSENT | — |
| FOURTH CONTAINER HOLDER | ABSENT | — |
| FIFTH CONTAINER HOLDER | ABSENT | — |
| SIXTH CONTAINER HOLDER | ABSENT | — |
| SEVENTH CONTAINER HOLDER | ABSENT | — |
| EIGHTH CONTAINER HOLDER | ABSENT | — |
| NINTH CONTAINER HOLDER | ABSENT | — |
| TENTH CONTAINER HOLDER | ABSENT | — |
| ELEVENTH CONTAINER HOLDER | ABSENT | — |
| TWELFTH CONTAINER HOLDER | ABSENT | — |
| THIRTEENTH CONTAINER HOLDER | ABSENT | — |
| FOURTEENTH CONTAINER HOLDER | ABSENT | — |
| FIFTEENTH CONTAINER HOLDER | ABSENT | — |
| SIXTEENTH CONTAINER HOLDER | ABSENT | — |
| SEVENTEENTH CONTAINER HOLDER | ABSENT | — |
| EIGHTEENTH CONTAINER HOLDER | ABSENT | — |
| NINETEENTH CONTAINER HOLDER | ABSENT | — |
| TWENTIETH CONTAINER HOLDER | ABSENT | — |

FIG. 16

| TRAY ID | CONTAINER NUMBER | SAMPLE TYPE | | INJECTION AMOUNT | ANALYSIS LINE | ANALYSIS METHOD | OUTPUT FORMAT |
|---|---|---|---|---|---|---|---|
| TRAYRED | 1 | STANDARD | FIRST CONCENTRATION | 1 UNIT | LINE 1 | METHOD A | FORMAT A |
| TRAYRED | 2 | STANDARD | SECOND CONCENTRATION | 1 UNIT | LINE 1 | METHOD A | FORMAT A |
| TRAYRED | 3 | STANDARD | THIRD CONCENTRATION | 1 UNIT | LINE 1 | METHOD A | FORMAT A |
| TRAYRED | 6 | UNKNOWN | | 1 UNIT | LINE 1 | METHOD A | FORMAT A |
| TRAYRED | 7 | UNKNOWN | | 1 UNIT | LINE 1 | METHOD A | FORMAT A |
| TRAYRED | 8 | UNKNOWN | | 1 UNIT | LINE 1 | METHOD A | FORMAT A |
| TRAYRED | 10 | CONTROL | | 1 UNIT | LINE 1 | METHOD A | FORMAT A |
| TRAYGREEN | 1 | UNKNOWN | | 3 UNITS | LINE 1 | METHOD A | FORMAT B |
| TRAYGREEN | 2 | UNKNOWN | | 3 UNITS | LINE 1 | METHOD A | FORMAT B |
| TRAYGREEN | 3 | UNKNOWN | | 3 UNITS | LINE 1 | METHOD A | FORMAT B |

CHROMATOGRAPH DATA PROCESSOR AND AUTOMATIC SAMPLE INJECTOR

BACKGROUND OF THE INVENTION

Field of the Invention

The present invention relates to a chromatograph data processor and an automatic sample injector.

Description of Related Art

Chromatographs have been known as analysis devices that separate substances included in samples into different components. In an analysis system, a plurality of samples are introduced into a chromatograph sequentially by an automatic sample injector, and the samples are analyzed. Therefore, a batch file for controlling the sequence of analysis of the samples is generally created. The automatic sample injector and the chromatograph are controlled based on the created batch file.

A batch file is a file in which the correspondence relationship between each sample, and an analysis condition or the like is described in a table format, for example. A user can create the batch file by inputting predetermined information to a table. For example, in the automatic analysis device described in WO 2016/189668 A1, a setting screen for a batch file is displayed in a display unit. The setting screen includes an image display area and a text display area. In the image display area, the image representing a plan view of a container holding unit of a sample is displayed. The user can create a batch file intuitively by performing a setting operation with respect to the image display area or the text display area.

BRIEF SUMMARY OF THE INVENTION

It is necessary that the user creates batch files on a daily basis before carrying out analysis of a sample. Therefore, it is desirable that a burden of creating a batch file for the user is reduced.

An object of the present invention is to provide a chromatograph data processor and an automatic sample injector that can create a batch file while reducing a burden on a user.

One aspect of the present invention relates to a chromatograph data processor connected to an automatic sample injector by which a sample held by any of a plurality of sample holders is introducible to a chromatograph, wherein first analysis information including at least one of a sample analysis condition, a sample preparation condition and a kind of sample is assigned to at least one kind of a jig, and the jig is arrangeable to correspond to any of the plurality of sample holders, and the chromatograph data processor may include a first information acquirer that acquires holding information representing whether a sample is held by each sample holder from the automatic sample injector and acquires jig information for identifying a kind the jig from the automatic sample injector, a first analysis information specifier that specifies first analysis information in regard to a corresponding sample holder based on the jig information acquired by the first information acquirer, and a batch file creator that creates a batch file for controlling a sequence of analysis or preparation in regard to a sample held by the sample holder corresponding to the jig by using the holding information acquired by the first information acquirer and the first analysis information specified by the first analysis information specifier.

Another aspect of the present invention relates to an automatic sample injector connected to a chromatograph data processor and by which a sample held by any of a plurality of sample holders is introducible to a chromatograph, wherein first analysis information including at least one of a sample analysis condition, a sample preparation condition and a kind of sample is assigned to at least one kind of a jig, and the jig is arrangeable to correspond to any of the plurality of sample holders, and the automatic sample injector includes a holding detector that detects whether a sample is held by each sample holder, a jig detector that detects jig information corresponding to a sample holder holding a sample, and an information notifier that notifies the chromatograph data processor of a result of detection by the holding detector as holding information and notifies the chromatograph data processor of jig information detected by the jig detector.

The present invention enables creation of a batch file while reducing a burden on a user.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWING

FIG. 8 is a diagram showing one example of pre-registration information acquired by a second information acquirer;

FIG. 9 is a diagram showing one example of pre-registration information acquired by the second information acquirer;

FIG. 10 is a diagram showing one example of pre-registration information acquired by the second information acquirer;

FIG. 12 is a diagram showing examples of tray IDs acquired by a tray ID acquirer;

FIG. 13 is a diagram showing an example of holding information and jig information acquired by a first information acquirer;

FIG. 14 is a diagram showing an example of holding information and jig information acquired by the first information acquirer;

FIG. 15 is a diagram showing an example of holding information and jig information acquired by the first information acquirer;

FIG. 16 is a diagram showing an example of a batch file created by a batch file creator;

DESCRIPTION OF THE PREFERRED EMBODIMENTS (1) Configuration of Analysis System A chromatograph data processor and an automatic sample injector according to one embodiment of the present invention will be described below with reference to the drawings. As shown in FIG. 1, the analysis system 400 includes the chromatograph data processor 100 (hereinafter abbreviated as a data processor 100), the automatic sample injector 200 and an analysis device 300.

Figure 1:
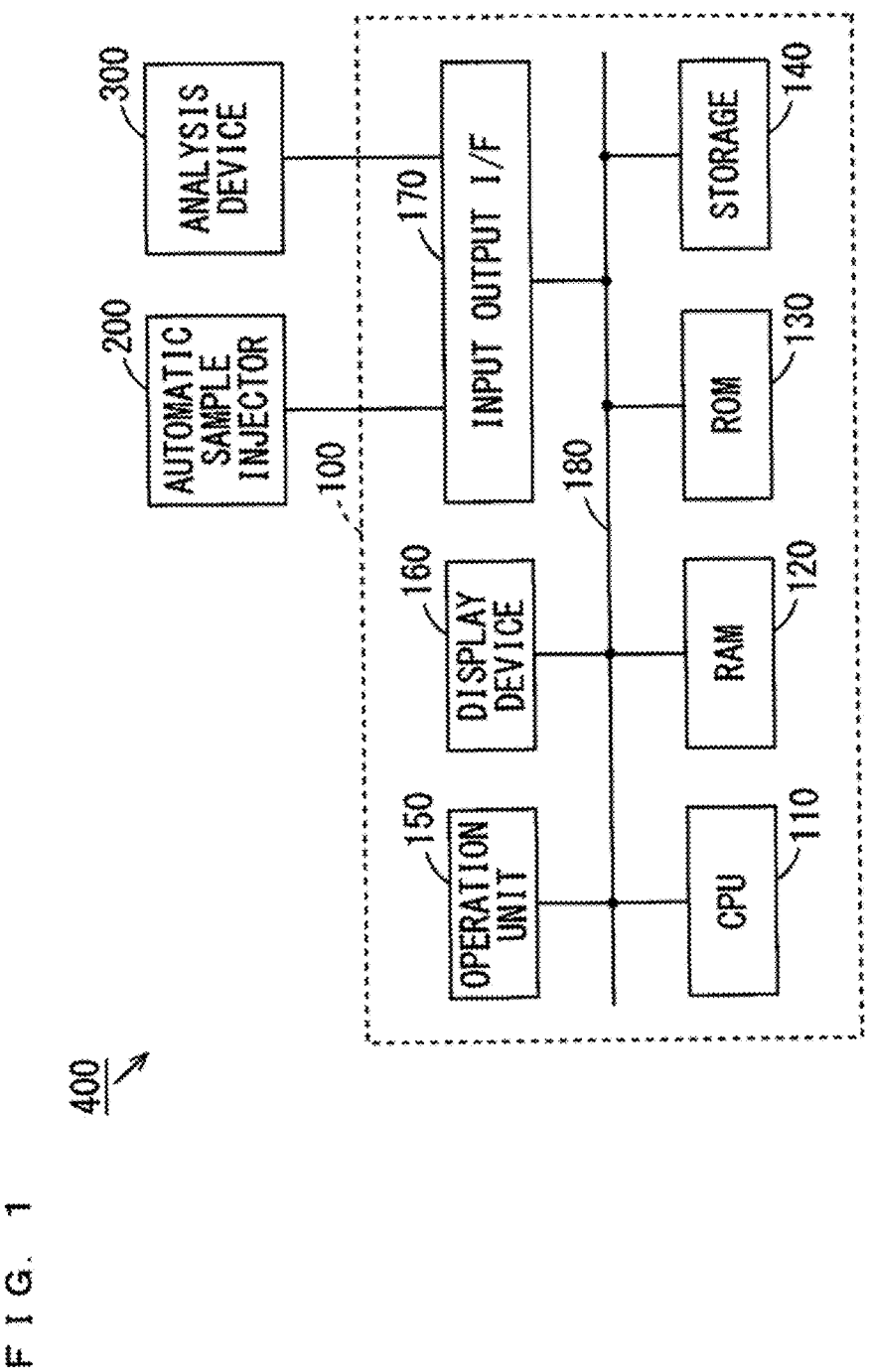
FIG. 1 is a diagram showing the configuration of an analysis system.

The data processor 100 is constituted by a CPU (Central Processing Unit) 110, a RAM (Random Access Memory) 120, a ROM (Read Only Memory) 130, a storage 140, an operation unit 150, a display device 160 and an input output I/F (interface) 170 and a bus 180. The CPU 110, the RAM 120, the ROM 130, the storage 140, the operation unit 150, the display device 160 and the input output I/F 170 are connected to the bus 180.

The RAM 120 is used as a work area for the CPU 110. A system program is stored in the ROM 130. The storage 140 includes a storage medium such as a hard disc or a semiconductor memory, and stores a data processing program and pre-registration information mentioned below. The data processing program and the pre-registration information may be stored in a storage medium different from the storage 140.

The CPU 110 executes the data processing program stored in the storage 140 or the like on the RAM 120, whereby a data process is executed. The data process is the process of automatically creating a batch file for controlling a sequence of analysis or preparation (a pre-process) of a plurality of samples and controlling operations of the automatic sample injector 200 and the analysis device 300 based on the created batch file. Details of the data process will be described below.

The operation unit 150 is an input device such as a keyboard, a mouse or a touch panel. The display device 160 is a display device such as a liquid crystal display device. A user of the analysis system 400 can provide various instructions to the data processor 100 using the operation unit 150. The display device 160 can display a batch file created by the data processor 100, a result of analysis by the analysis device 300 and so on. The input output I/F 170 is connected to the automatic sample injector 200 and the analysis device 300.

Figure 2:
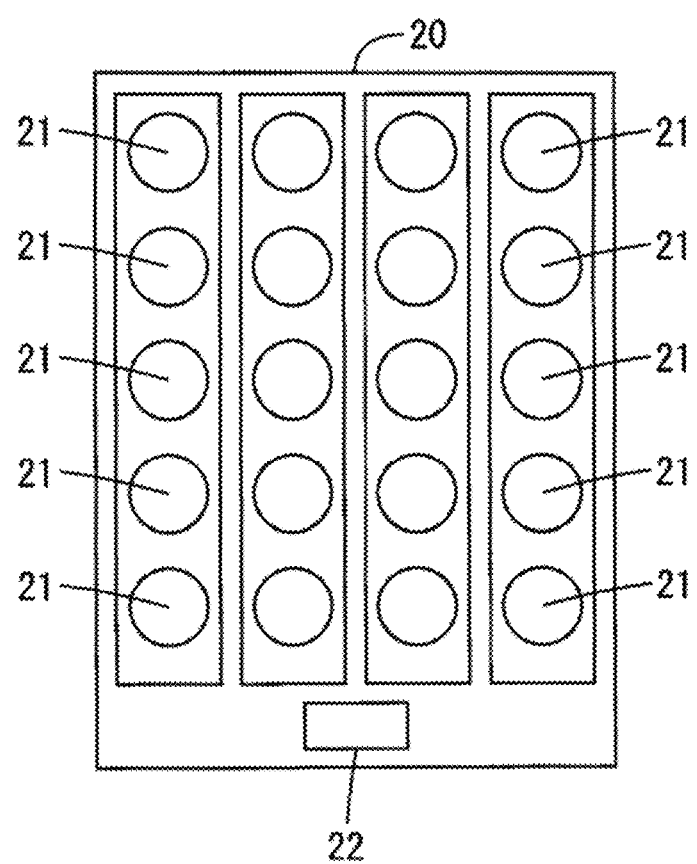
FIG. 2 is a plan view showing one example of a tray.

One or a plurality of trays provided with unique IDs (identifiers) are placed in the automatic sample injector 200. FIG. 2 is a plan view showing one example of a tray. As shown in FIG. 2, a plurality of container holders 21 and a tray ID display 22 are formed in the tray 20. The container holders 21 are an example of a sample holder. In the example of FIG. 2, the twenty container holders 21 that are arranged in five rows and four columns are formed in the tray 20.

Each container holder 21 is an opening having a certain depth. A sample container (vial) storing a sample is fitted into each container holder 21. Thus, the container holder 21 can hold a sample container. Further, each container holder 21 can hold a jig in a case where the jig to which a sample container is attached is fitted into the container holder 21.

Here, a plurality of kinds of jigs are prepared, and analysis information including at least one of a sample analysis condition, a sample preparation condition and a kind of sample is assigned to each kind of jig. In the present example, the above-mentioned analysis information is a sample type, and the jigs have different colors and shapes corresponding to the sample types. The sample type includes distinction among a standard sample, an unknown sample and a control sample. Further, in a case where a sample is a standard sample, the sample type also includes the concentration of a sample. Details of a jig will be described below.

The tray ID display 22 shows an ID (hereinafter referred to as a tray ID) that is an RF (Radio Frequency) ID tag, a barcode or a QR code (registered trademark), for example, and provided to the tray 20. The tray ID display 22 may be n magnets (n is an integer that is 1 or larger) and may show a tray ID by a binary code. In this case, the tray ID display 22 can show the tray IDs in $2^n$ ways.

Also in the present embodiment, other analysis information different from the analysis information assigned to the jig 40 is predetermined for each tray 20. Specifically, the analysis information determined for each tray 20 includes an analysis method including an analysis condition or an examination condition, a preparation condition, a sample injection amount, a below-mentioned analysis line of the analysis device 300, an output format of a result of analysis or the like.

The correspondence relationship between the above-mentioned analysis information and the tray ID of each tray 20 is stored (registered) in the storage 140 in advance as the pre-registration information. The pre-registration information is registered by a technician such as a field engineer when the automatic sample injector 200 is installed or an analysis protocol is formulated, for example. A batch file is created based on the registered pre-registration information and jig information for identifying the kind of jig. The user can also change the pre-registration information when preparing the analysis protocol such as the time when changing the sample injection amount.

The user of the analysis system 400 selects a tray 20 fitted to the desired analysis information as a tray 20 to be used for analysis. A comment field, a numbered tag or the like may be added to each tray 20 such that the tray 20 fitted to the desired analysis information can be easily identified. Alternatively, a plurality of trays 20 having different colors may be used.

The user attaches the sample container to a jig corresponding to the type of sample in the sample container as necessary. The user causes a suitable container holder 21 of the tray 20 to hold a sample container in which a suitable sample is stored according to the analysis information corresponding to a selected tray 20. Here, in a case where a sample container is attached to a jig, the sample container is held by a container holder 21 via the jig.

Thereafter, the user places the tray 20 in the automatic sample injector 200. Thus, the automatic sample injector 200 sucks the samples sequentially from the sample containers of the tray 20 according to the batch file created by the data processor 100, and introduces the samples to the analysis device 300. Details of the automatic sample injector 200 will be described below.

The analysis device 300 sequentially analyzes the samples introduced by the automatic sample injector 200 according to the batch file created by the data processor 100. While being a gas chromatograph in the present embodiment, the analysis device 300 may be a liquid chromatograph. Further, in the present embodiment, the analysis device 300 has a plurality of analyzers (analysis lines) and can analyze a sample in each of the plurality of analysis lines.

(2) Configuration of Jigs

Figure 3:
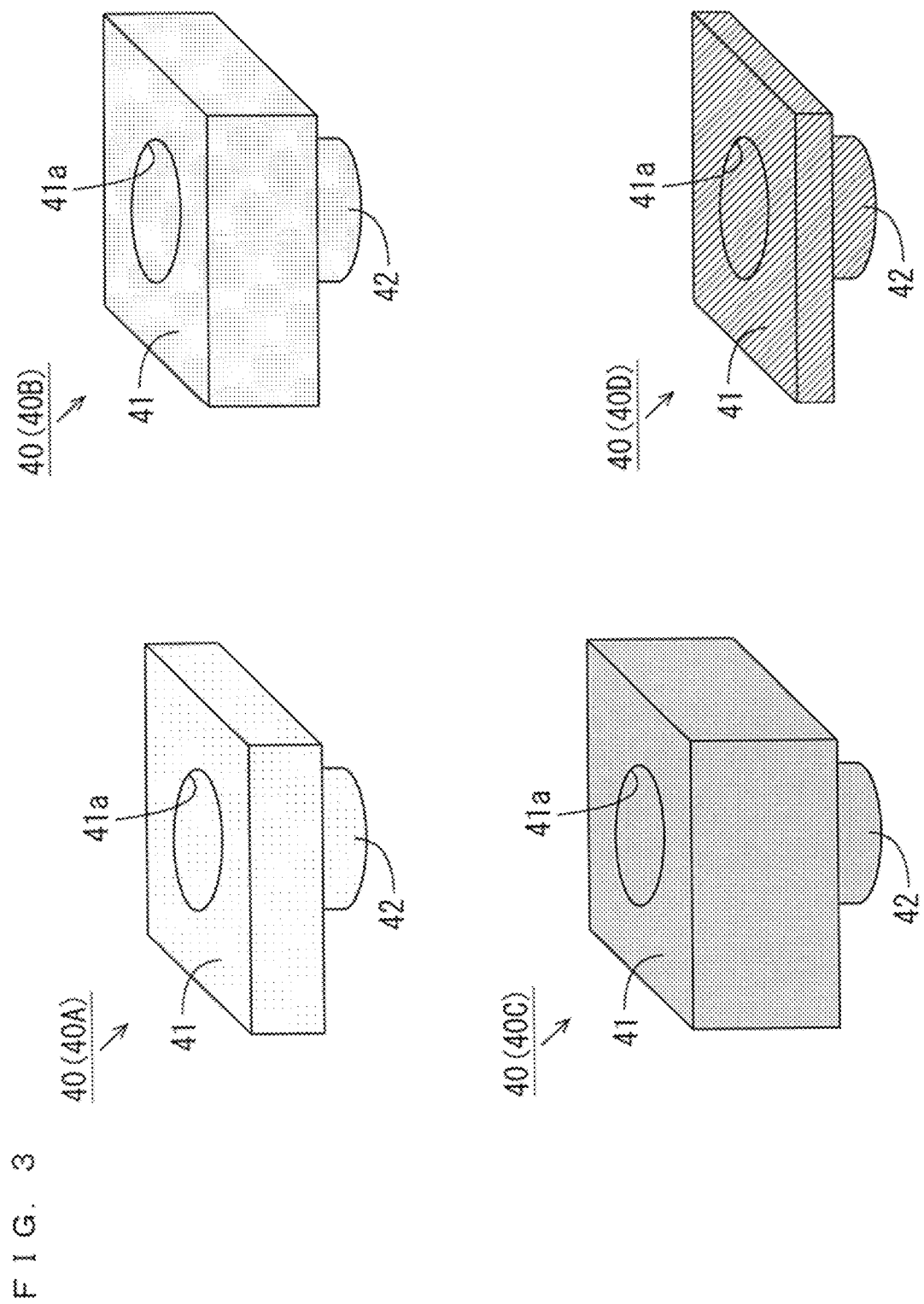
FIG. 3 is a perspective view showing the configuration of a jigs.

FIG. 3 is a perspective view showing the configuration of jigs. As shown in FIG. 3, the four kinds of jigs 40 are used in the present example. Each jig 40 is formed of resin, for example, and includes a pedestal portion 41 and a protruding portion 42. The pedestal portion 41 has a rectangular parallelepiped shape. A circular opening 41a having a certain depth is formed in an upper surface of the pedestal portion 41. The protruding portion 42 is columnar and protrudes downward from the lower surface of the pedestal portion 41.

The lower end of a sample container is fitted to an opening 41a, so that the sample container is attached to a jig 40. Further, a protruding portion 42 is fitted into a container holder 21 of the tray 20 of FIG. 2, so that a sample container is held by the container holder 21 via a jig 40.

In the following description, in a case where the four kinds of jigs 40 are distinguished from one another, the four kinds of the jigs 40 are respectively referred to as jigs 40A, 40B, 40C, 40D. The thickness of the pedestal portion 41 differs depending on each kind of a jig 40. Specifically, the thickness of the pedestal portion 41 of the jig 40C is larger than the thickness of the pedestal portion 41 of the jig 40B. The thickness of the pedestal portion 41 of the jig 40B is larger than the thickness of the pedestal portion 41 of the jig 40A. The thickness of the pedestal portion 41 of the jig 40A is larger than the thickness of the pedestal portion 41 of the jig 40D.

Therefore, in a case where a sample container is held by a container holder 21 via a jig 40, the height of the upper end of the sample container differs depending on each kind of a jig 40. Specifically, the heights of the upper ends of the sample containers held by container holders 21 via the jigs 40A to 40D are respectively first to fourth heights. The third height is larger than the second height, the second height is larger than the first height, and the first height is larger than the fourth height. The fourth height is larger than the height of the upper end of a sample container directly held by a container holder 21 without a jig 40 (hereinafter referred to as a reference height).

In the present example, the jig 40A is used for attachment of a sample container storing a standard sample having a first concentration (100 ppm, for example). The jig 40B is used for attachment of a sample container storing a standard sample having a second concentration (200 ppm, for example) that is higher than the first concentration. The jig 40C is used for attachment of a sample container storing a standard sample having a third concentration (500 ppm, for example) that is higher than the second concentration. The jig 40D is used for attachment of a sample container storing a control sample.

Figure 4:
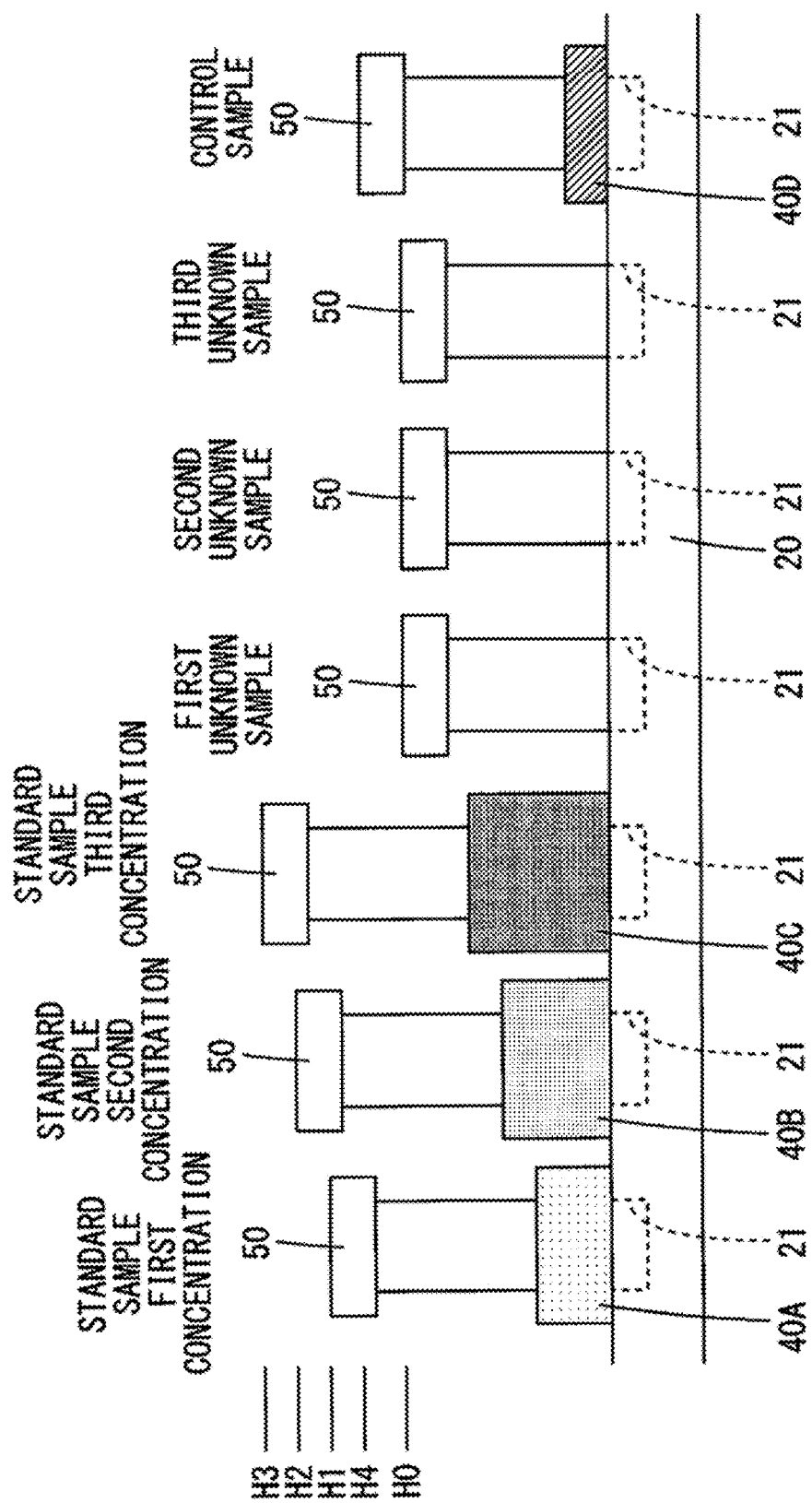
FIG. 4 is a diagram showing one example of a tray in which a plurality of sample containers are held.

Here, the four kinds of the jigs 40 have colors that are different from one another. Therefore, the user can easily identify the four kinds of the jigs 40 and attach a sample container to the jig 40 corresponding to a sample type. The color depth (saturation level) of the jigs 40A, 40B, 40C may correspond to the concentration of a standard sample. In this case, the user can intuitively associate the kind of a jig 40 with the concentration of a standard sample. In FIG. 4, the color depth of each of the jigs 40A to 40C is represented by the density of each dot pattern.

The user selects the tray 20 that is fitted to the desired analysis information, and causes each container holder 21 of the selected tray 20 to hold a sample container. FIG. 4 is a diagram showing one example of a tray 20 in which a plurality of sample containers are held. In FIG. 4, the plurality of container holders 21 are not arranged in five rows and four columns as shown in FIG. 2 but are arranged in a row in the left-and-right direction for simple explanation.

In the example of FIG. 4, it is considered that a standard sample having the first concentration, a standard sample having the second concentration, a standard sample having the third concentration, a first unknown sample, a second unknown sample, a third known sample and a control sample are sequentially analyzed. The standard samples having the first, second and third concentrations are used to define a multi-point calibration curve.

In this case, the user causes the first container holder 21 from the left to hold the standard sample having the first concentration via the jig 40A. Further, the user causes the second container holder 21 from the left to hold the standard sample having the second concentration via the jig 40B. Further, the user causes the third container holder 21 from the left to hold the standard sample having the third concentration via the jig 40C.

Similarly, the user causes the fourth to sixth container holders 21 from the left to respectively hold the first to third unknown samples without jigs 40. Further, the user causes the seventh container holder 21 from the left to hold the control sample via the jig 40D.

Thereafter, the automatic sample injector 200 of FIG. 1 detects the height of the upper end of the sample container 50 held by each container holder 21 (hereinafter simply referred to as the height of the sample container 50). In the present example, it is detected that the heights of the first to third sample containers 50 from the left are respectively a first height H1, a second height H2 and a third height H3. Therefore, it is specified that the first to third sample containers 50 from the left respectively store the standard samples having the first to third concentrations.

Similarly, it is detected that the height of each of the fourth, fifth and sixth sample containers 50 from the left is a reference height H0. Therefore, it is determined that unknown samples are stored in the fourth, fifth and sixth sample containers 50 from the left. It is detected that the height of the seventh sample container 50 from the left is a fourth height H4. Therefore, it is determined that a control sample is stored in the seventh sample container 50 from the left. The determined sample type is used for creation of a batch file.

(3) Automatic Sample Injector

Figure 5:
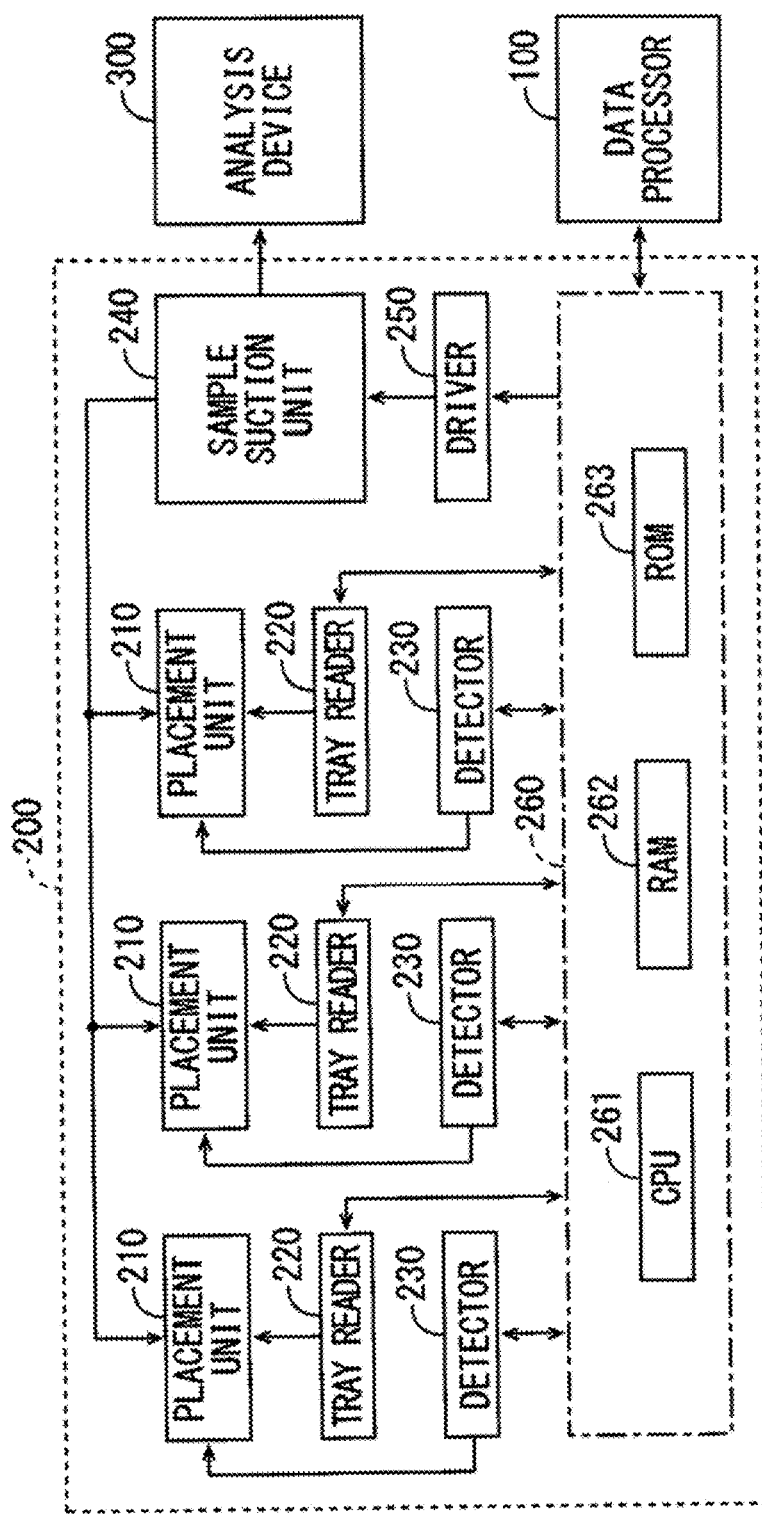
FIG. 5 is a diagram showing the configuration of an automatic sample injector.
Figure 6:
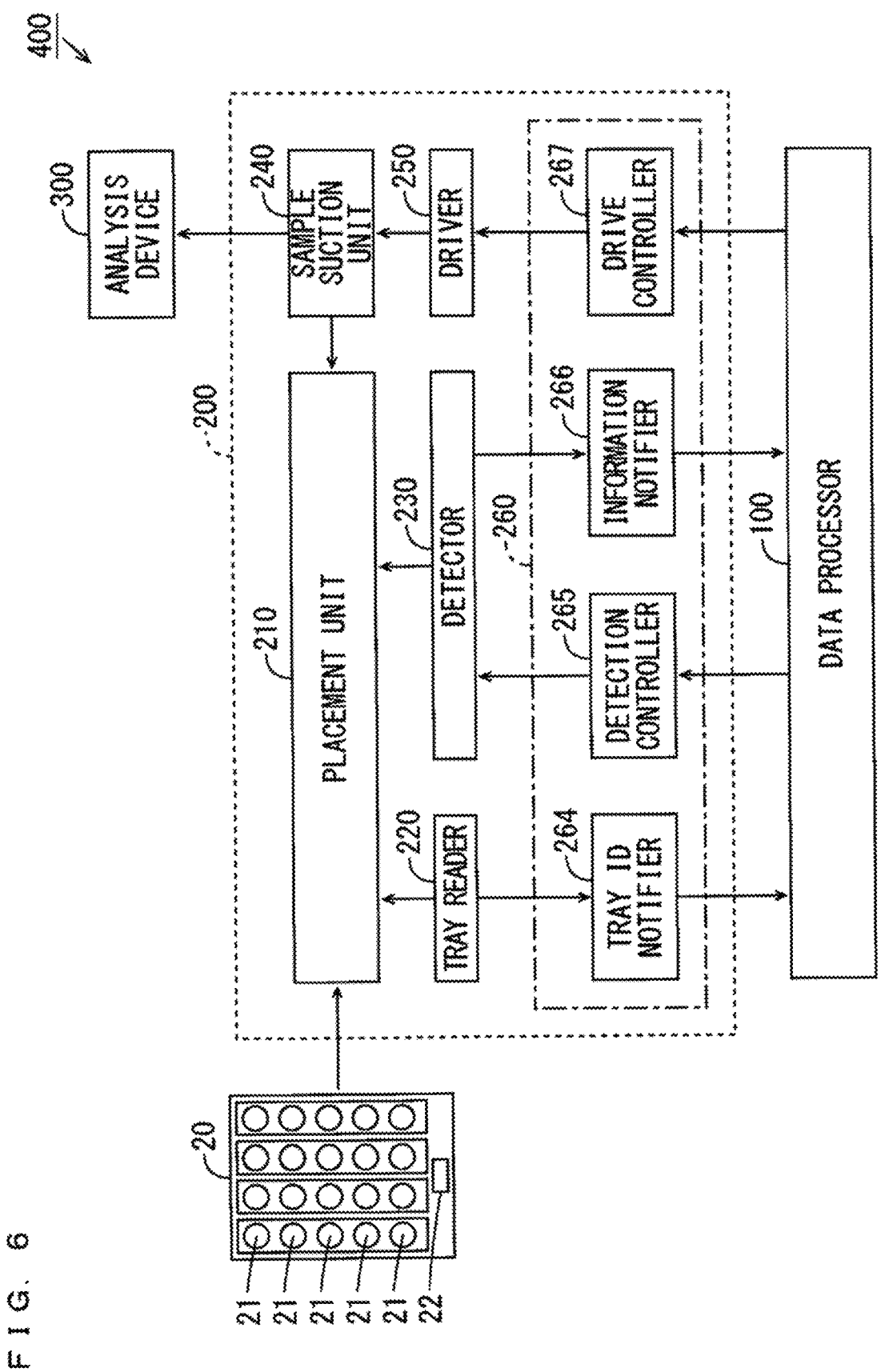
FIG. 6 is a diagram showing the configuration of the automatic sample injector.

FIGS. 5 and 6 are diagrams showing the configuration of the automatic sample injector 200. The configuration of hardware of the automatic sample injector 200 is shown in FIG. 5, and the functional configuration of the automatic sample injector 200 is shown in part of FIG. 6. As shown in FIGS. 5 and 6, the automatic sample injector 200 includes a plurality of placement units 210, a plurality of tray readers 220, a plurality of detectors 230, a sample suction unit 240, a driver 250 and a control device 260. The control device 260 is constituted by a CPU 261, a RAM 262 and a ROM 263.

While the plurality of tray readers 220 and the plurality of detectors 230 are provided to respectively correspond to the plurality (three in the present example) of placement units 210 in the present embodiment, the embodiment is not limited to this. One tray reader 220 that can access the plurality of placement units 210 may be provided, or one detector 230 that can access the plurality of placement units 210 may be provided. In FIG. 6, one tray reader 220 and one detector 230 are shown, and the other tray readers 220 and the other detectors 230 are not shown.

A tray 20 can be placed in each placement unit 210. A tray reader 220 is an RFID reader, a barcode reader or a QR code reader, for example. In a case where the tray ID display 22 is a magnet, the tray reader 220 may be a magnet sensor. The tray reader 220 reads a tray ID from the tray ID display 22 of the tray 20 placed in a corresponding placement unit 210, and supplies the read tray ID to the control device 260.

The detector 230 is an example of a holding detector and a jig detector, and includes a photointerrupter, for example. The sample suction unit 240 includes a syringe, a holder for the syringe, a holder for the tray 20 and the like. The driver 250 includes a plurality of actuators. An actuator may include a stepping motor, for example.

The detector 230 optically determines whether the syringe of the sample suction unit 240 comes into contact with the upper end of the sample container 50. Thus, the detector 230 detects whether a sample container 50 is held by each container holder 21 of the tray 20 placed in the corresponding placement unit 210, and supplies the holding information representing whether a sample container 50 is held by each container holder 21 of the tray 20 to the control device 260.

Further, in a case where a sample container 50 is held by any container holder 21, that is, in a case where the syringe of the detector 230 comes into contact with the upper end of the sample container 50, the detector 230 detects the contact position with the upper end of the sample container 50 as the height of the sample container 50. The detected height of the sample container 50 differs depending on the kind of a jig 40. As such, the detector 230 supplies the detected height of a sample container 50 to the control device 260 as the jig information for identifying the kind of the jig 40.

In the present example, the jig information also includes the information as to whether a jig 40 is attached to a sample container 50, and the height of the sample container 50 in a case where a jig 40 is not attached can also be used to specify a sample type. Therefore, it is possible to distinguish the five sample types by preparing the four kinds of the jigs 40.

Further, in the present example, the detector 230 detects whether a sample container 50 is held by each container holder 21, and detects the jig information corresponding to the container holder 21 holding the sample container 50. Therefore, it is unnecessary to provide a holding detector that detects whether a sample container 50 is held separately from a jig detector that detects the jig information. Thus, the manufacturing cost of the automatic sample injector 200 can be reduced, and the size of the automatic sample injector 200 can be reduced. However, the embodiment is not limited to this, and the holding detector and the jig detector may be provided separately instead of the detector 230.

The height of the above-mentioned sample container 50 may be detected by the number of pulses of the stepping motor. Further, in a case where the detector 230 includes a linear encoder that reads the movement amount of a syringe, the height of the sample container 50 may be detected based on the read movement amount of the syringe. Alternatively, in a case where the detector 230 includes a camera or a distance measurement sensor that measures the distance to the upper surface of the sample container 50, the height of the sample container 50 may be detected based on the measured distance.

The driver 250 scans the syringe above the tray 20 by driving the sample suction unit 240 and the tray 20 at the time of detection of the above-mentioned sample container 50. Further, the driver 250 drives the sample suction unit 240 and the tray 20 at the time of introduction of a sample, whereby a sample is introduced into the analysis device 300 from a sample container 50 held by a container holder 21 of the tray 20.

Specifically, a sample vaporization chamber of the analysis device 300 is arranged below the syringe of the sample suction unit 240. The driver 250 is configured to be capable of moving the syringe between a predetermined reference position and a position below the predetermined reference position. Further, the driver 250 is configured to be capable of moving the tray 20 between a placement unit 210 and a suction position below the reference position and above the sample vaporization chamber.

The tray 20 is moved to the suction position, and then the syringe is moved from the reference position to the suction position below the reference position. Thus, the needle of the syringe is inserted into a sample container 50 held by a predetermined container holder 21 of the tray 20. The plunger of the syringe is driven in this state, so that a sample is sucked by the syringe. Further, the tray 20 is retracted from the suction position, and then the syringe is moved to a position below the suction position. Thus, the needle of the syringe is inserted into the sample vaporization chamber. The plunger of the syringe is driven in this state, so that the sample is introduced into the sample vaporization chamber.

As shown in FIG. 6, the control device 260 includes a tray ID notifier 264, a detection controller 265, an information notifier 266 and a drive controller 267 as functions. The CPU 261 of FIG. 5 executes an application program such as a notification program stored in the ROM 263 on the RAM 262, whereby the functions of the control device 260 are realized and a notification process, described below, is executed. Part or all of the functions of the control device 260 may be realized by hardware such as an electronic circuit.

The tray ID notifier 264 acquires a tray ID from each tray reader 220, and notifies the data processor 100 of the tray ID. In response to an instruction provided by the user, the detection controller 265 controls the detector 230 to detect whether a sample container 50 is held by each container holder 21 of each tray 20. The user can instruct the detection controller 265 to start detection by operating a predetermined button provided in the data processor 100 or the automatic sample injector 200. The button for providing an instruction for starting detection may include a button on a graphical user interface.

The information notifier 266 acquires the holding information and the jig information from each detector 230 and notifies the data processor 100 of the holding information and the jig information. The drive controller 267 controls the driver 250 such that a sample container 50 is detected, and controls the driver 250 such that a sample is introduced into the analysis device 300.

(4) Configuration of Data Processor

Figure 7:
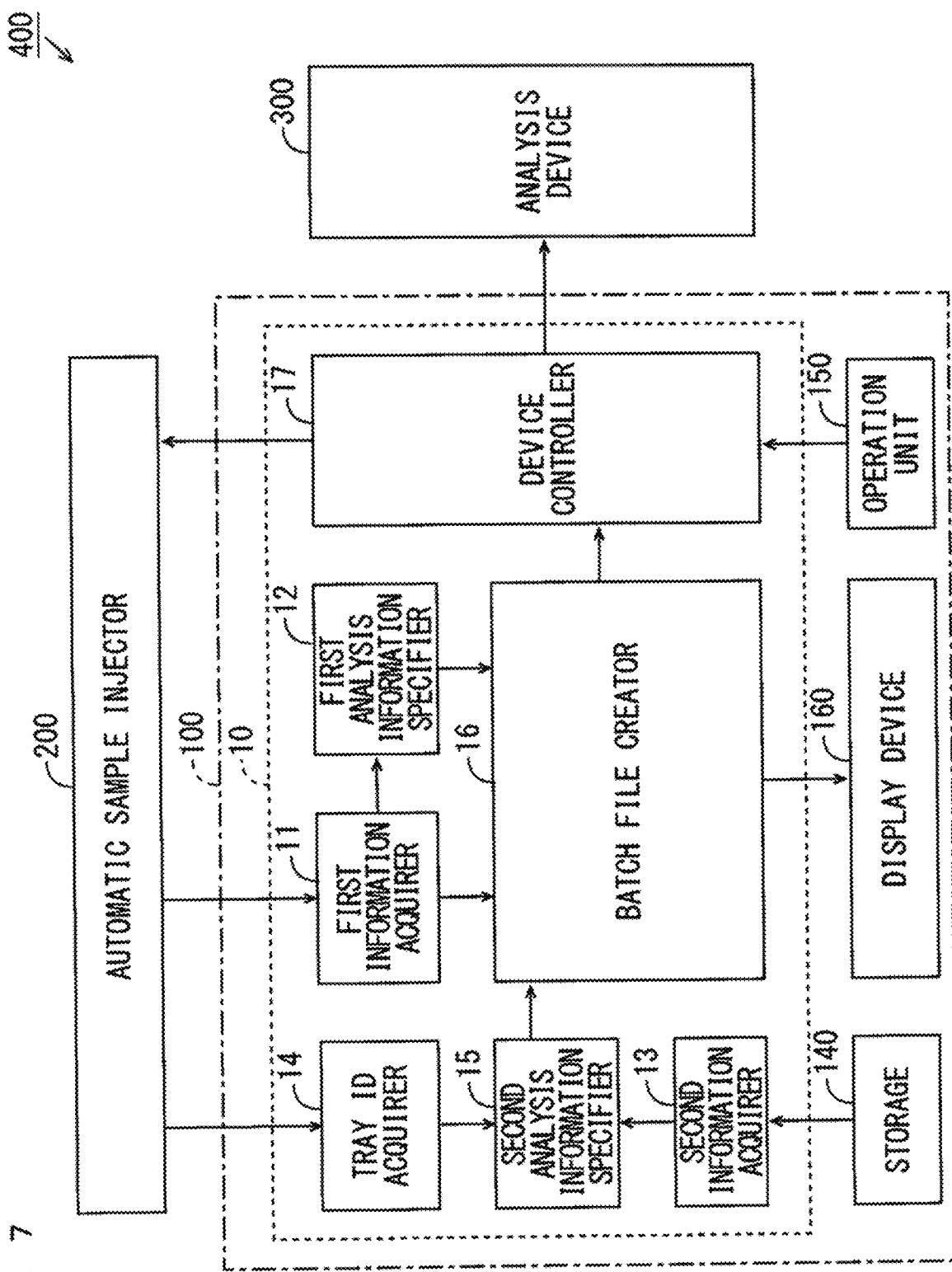
FIG. 7 is a diagram showing the functional configuration of a data processor.

FIG. 7 is a diagram showing the functional configuration of the data processor 100. As shown in FIG. 7, the data processor 100 includes a first information acquirer 11, a first analysis information specifier 12, a second information acquirer 13, a tray ID acquirer 14, a second analysis information specifier 15, a batch file creator 16 and a device controller 17 as a function unit 10. The CPU 110 of FIG. 1 executes the data processing program stored in the storage 140 or the like, whereby the function unit 10 is realized. Part or all of the function unit 10 may be realized by hardware such as an electronic circuit.

The first information acquirer 11 acquires the holding information and the jig information from the automatic sample injector 200. The first analysis information specifier 12 specifies the type of a sample in a sample container 50 based on the jig information acquired by the first information acquirer 11.

The second information acquirer 13 acquires the pre-registration information registered in the storage 140. In a case where the pre-registration information is registered in a storage medium different from the storage 140, the second information acquirer 13 acquires the pre-registration information from the storage medium. Further, in a case where the tray 20 of FIG. 2 includes a storage element, the pre-registration information corresponding to each tray 20 may be registered in the storage element of the tray 20. In this case, the second information acquirer 13 acquires the pre-registration information from the storage element of each tray 20.

The tray ID acquirer 14 acquires a tray ID from the automatic sample injector 200. The second analysis information specifier 15 specifies the analysis information corresponding to the tray ID acquired by the tray ID acquirer 14 based on the pre-registration information acquired by the second information acquirer 13.

The batch file creator 16 creates a batch file based on the holding information acquired by the first information acquirer 11, the sample type specified by the first analysis information specifier 12 and the analysis information specified by the second analysis information specifier 15. The device controller 17 controls the automatic sample injector 200 or the analysis device 300 such that samples are analyzed or prepared based on the batch file created by the batch file creator 16.

(5) Steps of Creating Batch File

The steps of creating a batch file will be described below. FIGS. 8 to 10 are diagrams showing one example of the pre-registration information acquired by the second information acquirer 13. Specifically, FIG. 8 shows the pre-registration information in regard to the tray 20 provided with the tray ID "TrayRed." FIG. 9 shows the pre-registration information in regard to the tray 20 provided with the tray ID "TrayGreen." FIG. 10 shows the pre-registration information in regard to the tray 20 provided with the tray ID "TrayBlue."

As for the tray 20 of FIG. 8, it is defined that the sample injection amount is one unit, the analysis line is a "line 1," the analysis method is a "method A" and the output format of the result of analysis is a "format A." As for the tray 20 of FIG. 9, it is defined that the sample injection amount is three units, the analysis line is a "line 1," the analysis method is a "method B" and the output format of the result of analysis is a "format B." As for the tray 20 of FIG. 10, it is defined that the sample injection amount is two units, the analysis line is a "line 2," the analysis method is a "method C" and the output format of the result of analysis is a "format C."

As described above, the user of the analysis system 400 selects a tray 20 to be used for analysis, and causes a suitable container holder 21 to hold a sample container 50 in which a suitable sample is stored according to the analysis information corresponding to the selected tray 20. Here, in a case where a standard sample or a control sample is stored in the sample controller 50, the user causes a container holder 21 to hold the sample container 50 via a corresponding jig 40.

Figure 11:
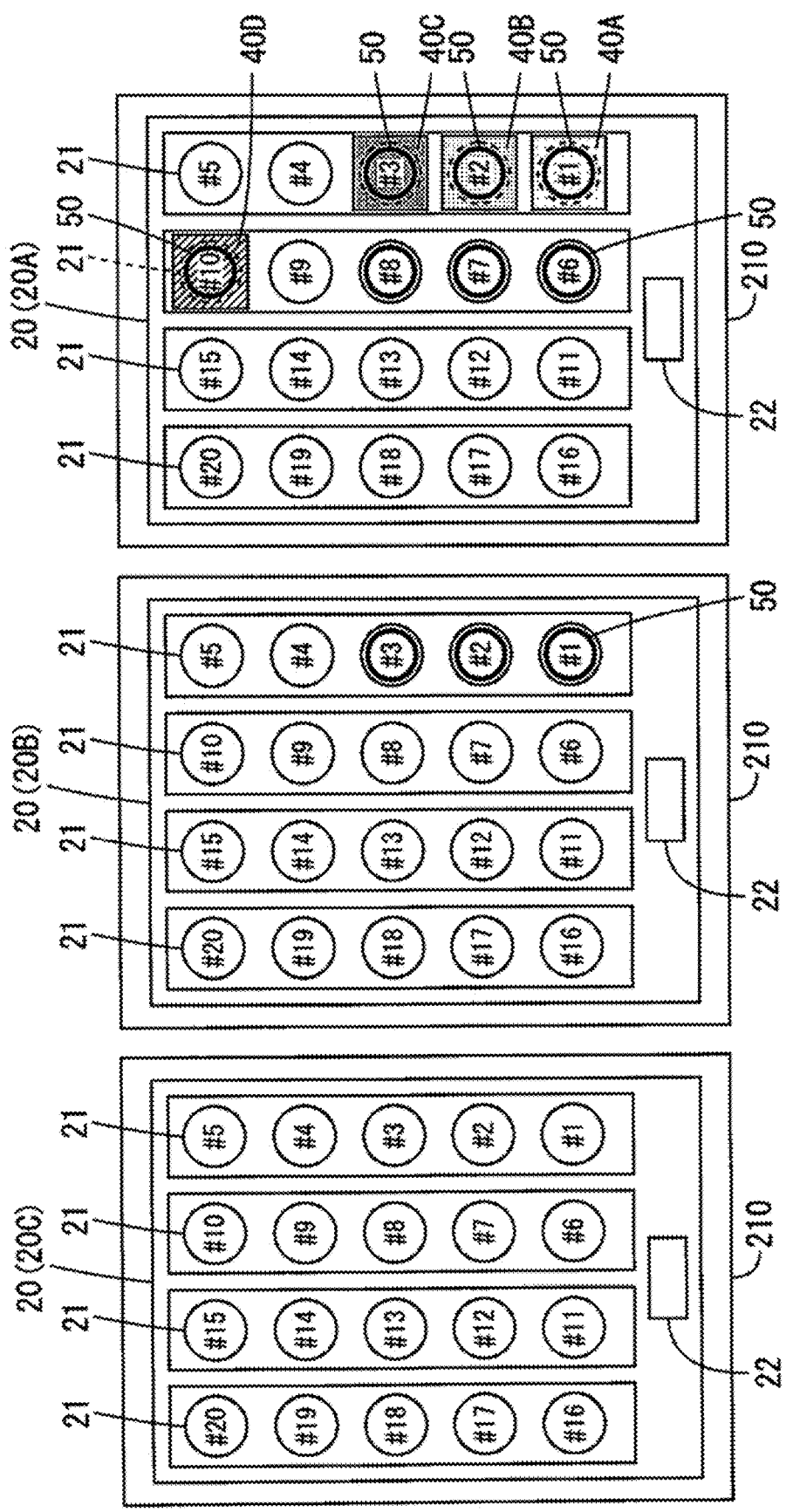
FIG. 11 is a diagram showing trays placed in placement units.

Thereafter, the user places the tray 20 in a placement unit 210 of the automatic sample injector 200 of FIG. 5. FIG. 11 is a diagram showing trays 20 placed in placement units 210. As shown in FIG. 11, the three trays 20 are respectively placed in the three placement units 210 in the present example. In the following description, in a case where the three trays 20 are to be distinguished from one another, the three trays 20 are respectively referred to as trays 20A, 20B, 20C.

In the present example, because the tray 20A is red, "TrayRed" is provided to the tray 20A as the tray ID. Because the tray 20B is green, "TrayGreen" is provided to the tray 20B as the tray ID. Because the tray 20C is blue, "TrayBlue" is provided to the tray 20C as the tray ID. The embodiment is not limited to this, and the numbers or the like may be provided to the tray 20 regardless of the color.

In the example of FIG. 11, sample containers 50 are respectively held by first to third container holders 21 via jigs 40A to 40C in the tray 20A. Further, sample containers 50 are respectively and directly held by sixth to eighth container holders 21. Further, a sample container 50 is held by a tenth container holder 21 via a jig 40D. Sample containers 50 are not held by the other container holders 21.

In the tray 20B, sample containers 50 are respectively and directly held by first to third container holders 21, and sample containers 50 are not held by the other container holders 21. In the tray 20C, a sample container 50 is not held by any of the container holders 21.

A tray ID is read by the tray reader 220 of FIG. 5 from the tray ID display 22 of each tray 20 of FIG. 11. Thus, the tray ID of each tray 20 is acquired by the tray ID acquirer 14 of FIG. 7. FIG. 12 is a diagram showing the examples of the tray IDs acquired by the tray ID acquirer 14. In the example of FIG. 12, the tray IDs of the trays 20 placed in the first, second and third placement units 210 are respectively "TrayRed," "TrayGreen" and "TrayBlue."

Thereafter, whether a sample container 50 is held by each container holder 21 of each tray 20 of FIG. 11 is detected by the detector 230 of FIG. 5 in response to an instruction provided by the user. Further, in a case where a sample container 50 is held by any of the container holders 21, the height of the sample container 50 is detected. Thus, the holding information and the jig information are acquired by the first information acquirer 11 of FIG. 7. The user can instruct the detector 230 via the device controller 17 to start detection by performing a predetermined operation using the operation unit 150 of FIG. 11.

FIGS. 13 to 15 are diagrams showing the examples of the holding information and the jig information acquired by the first information acquirer 11. As shown in FIG. 13, as for the tray 20 placed in the first placement unit 210, a sample container 50 is held by each of the first, second, third, sixth, seventh, eighth and tenth container holders 21, and sample containers 50 are not held by the other container holders 21. The heights of the sample containers 50 held by the first to third container holders 21 are respectively the first to third heights. The heights of the sample containers 50 held by the sixth to eighth container holders 21 are respectively the reference height. The height of the sample container 50 held by the tenth container holder 21 is a fourth height.

As shown in FIG. 14, in regard to the tray 20 placed in the second placement unit 210, a sample container 50 is held by each of the first to third container holders, and sample containers 50 are not held by the other container holders 21. Further, the heights of the sample containers 50 held by the first to third container holders 21 are respectively the reference height. As shown in FIG. 15, as for the tray 20 placed in the third placement unit 210, a sample container 50 is not held by any of the container holders 21.

The first analysis information specifier 12 of FIG. 7 specifies the type of a sample in a sample container 50 based on the height of the sample container 50 represented by the jig information of FIGS. 13 to 15. The second analysis information specifier 15 of FIG. 7 specifies the analysis information corresponding to each tray ID by comparing the tray IDs of FIG. 12 with the tray IDs of the pre-registration information of FIGS. 8 to 10. As for each of the samples the types of which have been specified by the first analysis information specifier 12, the batch file creator 16 of FIG. 7 creates a batch file such that the samples are sequentially analyzed or prepared according to the analysis information specified by the second analysis information specifier 15.

FIG. 16 is a diagram showing the example of the batch file created by the batch file creator 16. In the example of FIG. 16, as for to the seven samples held by the tray 20 (the tray 20A) having the tray ID "TrayRed" and the three samples held by the tray 20 (the tray 20B) having the tray ID "TrayGreen," a batch file for controlling the total ten analyses is created. Further, the "container number X" is provided to the sample container 50 held by the X-th container holder 21 in the batch file.

In the first analysis, one unit of the standard sample having the first concentration in the "container number 1" of the tray 20A is injected into the "line 1," the sample is analyzed by the "method A" and the result of analysis is output in the "format A." In the second analysis, as for the standard sample having the second concentration in the "container number 2" of the tray 20A, the control is carried out similarly to the control of the first analysis. In the third analysis, as for the standard sample having the third concentration in the "container number 3" of the tray 20A, the control is carried out similarly to the control of the first analysis.

In the fourth to sixth analyses, as for the unknown samples in the "container number 6" to the "container number 8" of the tray 20A, the control is carried out similarly to the control of the first analysis. In the seventh analysis, as for the control sample in the "container number 10" of the tray 20A, the control is carried out similarly to the control of the first analysis.

In the eighth analysis, three units of the unknown sample in the "container number 1" of the tray 20B are injected to the "line 1," the sample is analyzed by the "method B," and the result of analysis is output in the "format B." In the ninth and tenth analyses, as for each of the unknown samples in the "container number 2" and the "container number 3" of the tray 20B, the control is carried out similarly to the control of the eighth analysis.

(6) Notification Process

Figure 17:
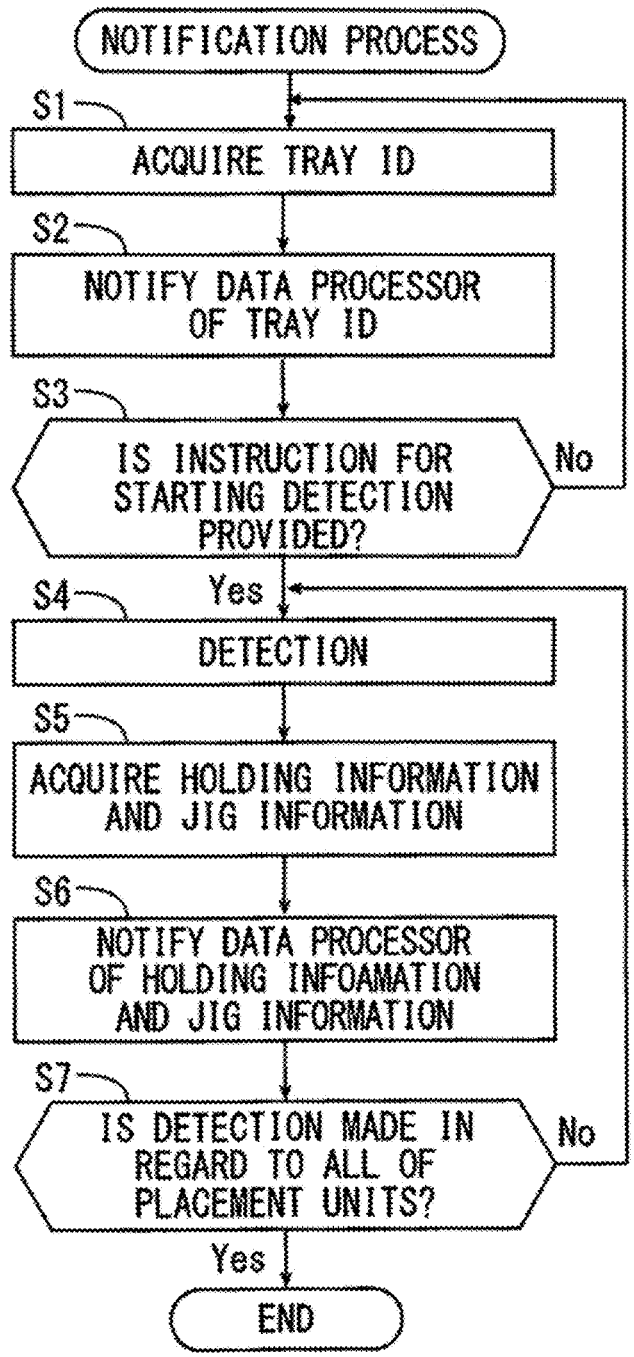
FIG. 17 is a flowchart showing one example of the algorithm of a notification process executed by a notification program.

FIG. 17 is a flow chart showing one example of the algorithm of the notification process executed by the notification program. One example of the notification process will be described below with reference to the automatic sample injector 200 of FIG. 6 and the flow chart of FIG. 17.

As shown in FIG. 17, the tray ID notifier 264 acquires a tray ID from each tray reader 220 (step S1). Further, the tray ID notifier 264 notifies the data processor 100 of the tray ID acquired in the step S1 (step S2). Next, the detection controller 265 determines whether an instruction for starting detection has been provided (step S3). In a case where the instruction for starting detection is not provided, the detection controller 265 returns to the step S1. The steps S1 to S3 are repeated until the instruction for starting detection is provided.

The user can provide the instruction for starting detection by operating the data processor 100 or the automatic sample injector 200. Further, the user can change the tray 20 to be used for analysis until providing the instruction for starting detection. The step S2 may be performed at a point in time later than the step S3 in which the tray 20 to be used for analysis is confirmed.

In a case where the instruction for starting detection is provided, the detection controller 265 detects whether a sample container 50 is held by each container holder 21 of the tray 20 placed in the placement unit 210 by using the detector 230 (step S4). Here, as for a sample container 50 that is determined to be held by a container holder 21, the height of the sample container 50 is also detected.

The information notifier 266 acquires the holding information and the jig information representing the result of detection in the step S4 from the detector 230 (step S5). Further, the information notifier 266 notifies the data processor 100 of the holding information and the jig information acquired in the step S5 (step S6).

Thereafter, the detection controller 265 determines whether detection has been made in regard to all of the placement units 210 (step S7). In a case where detection has not been made in regard to all of the placement units 210, the detection controller 265 returns to the step S4. The steps S4 to S7 are repeated until detection is made in regard to all of the placement units 210. In a case where detection is made in regard to all of the placement units 210, the detection controller 265 ends the notification process. The step S6 may be performed all at once after the step S7 in which it is confirmed that detection is made in regard to all of the placement units 210.

(7) Data Process

Figure 18:
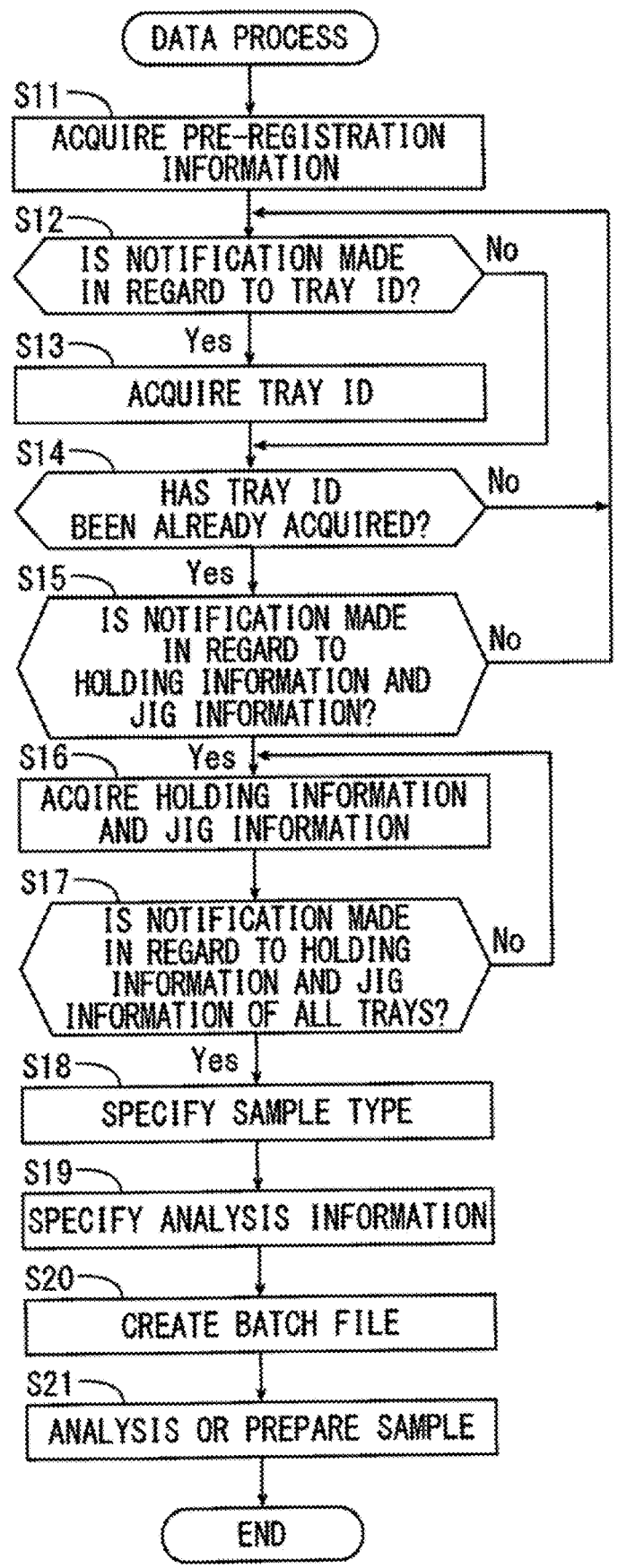
FIG. 18 is a flow chart showing one example of the algorithm of a data process executed by a data processing program.

FIG. 18 is a flow chart showing one example of the algorithm of the data process executed by the data processing program. One example of the data process will be described below with reference to the data processor 100 of FIG. 7 and the flow chart of FIG. 18.

As shown in FIG. 18, the second information acquirer 13 acquires the pre-registration information from the storage 140 or a predetermined storage medium (step S11). Next, the tray ID acquirer 14 determines whether having been notified of a tray ID from the automatic sample injector 200 (step S12). In a case where the step S2 of the notification process of FIG. 17 is performed, the tray ID acquirer 14 is notified of a tray ID. In a case where not being notified of a tray ID, the tray ID acquirer 14 proceeds to the step S14. In a case where being notified of a tray ID, the tray ID acquirer 14 acquires the tray ID (step S13) and proceeds to the step S14.

In the step S14, the tray ID acquirer 14 determines whether a tray ID has already been acquired (step S14). In a case where a tray ID has not been acquired, the tray ID acquirer 14 returns to the step S12. The steps S12 to S14 are repeated until a tray ID is acquired.

In a case where a tray ID has already been acquired in the step S14, the first information acquirer 11 determines whether having been notified of the holding information and the jig information from the automatic sample injector 200 (step S15). In a case where the step S6 of the notification process of FIG. 17 is performed, the first information acquirer 11 is notified of the holding information and the jig information.

In a case where not being notified of the holding information and the jig information, the first information acquirer 11 returns to the step S12. The steps S12 to S15 are repeated until the first information acquirer 11 is notified of the holding information and the jig information. In a case where the tray 20 to be used for analysis is changed, the tray ID acquirer 14 is notified of a new tray ID in the step S12, and the tray ID that has already been acquired in the step S13 is updated to the new tray ID.

In a case where being notified of the holding information and the jig information in the step S15, the first information acquirer 11 acquires the holding information and the jig information (step S16). Subsequently, the first information acquirer 11 determines whether having been notified of the holding information and the jig information of all of the trays 20 placed in the placement unit 210 (step S17). In a case where not having been notified of the holding information and the jig information of all of the trays 20, the first information acquirer 11 returns to the step S16. The steps S16 and S17 are repeated until the first information acquirer 11 is notified of the holding information and jig information of all of the trays 20.

Thereafter, the first analysis information specifier 12 specifies the types of the samples in the sample containers 50 held by the container holders 21 of all of the trays 20 based on the jig information acquired in the step S16 (step S18). Further, the second analysis information specifier 15 specifies the analysis information corresponding to the tray ID acquired in the step S13 based on the pre-registration information acquired in the step S11 (step S19). The step S19 may be performed at any point in time after the step S13.

Next, the batch file creator 16 creates a batch file based on the holding information acquired in the step S16, the sample types specified in the step S18 and the analysis information specified in the step S19 (step S20). The created batch file may be displayed in the display device 160.

Finally, the device controller 17 controls the automatic sample injector 200 or the analysis device 300 based on the batch file created in the step S20, thereby analyzing or preparing a sample (step S21). While the step S21 is performed automatically after the step S20 in the present embodiment, the embodiment is not limited to this. The step S21 does not have to be performed after the step S20. Alternatively, the step S21 may be performed in response to an instruction provided by the user after the step S20.

(8) Modified Examples

Figure 19:
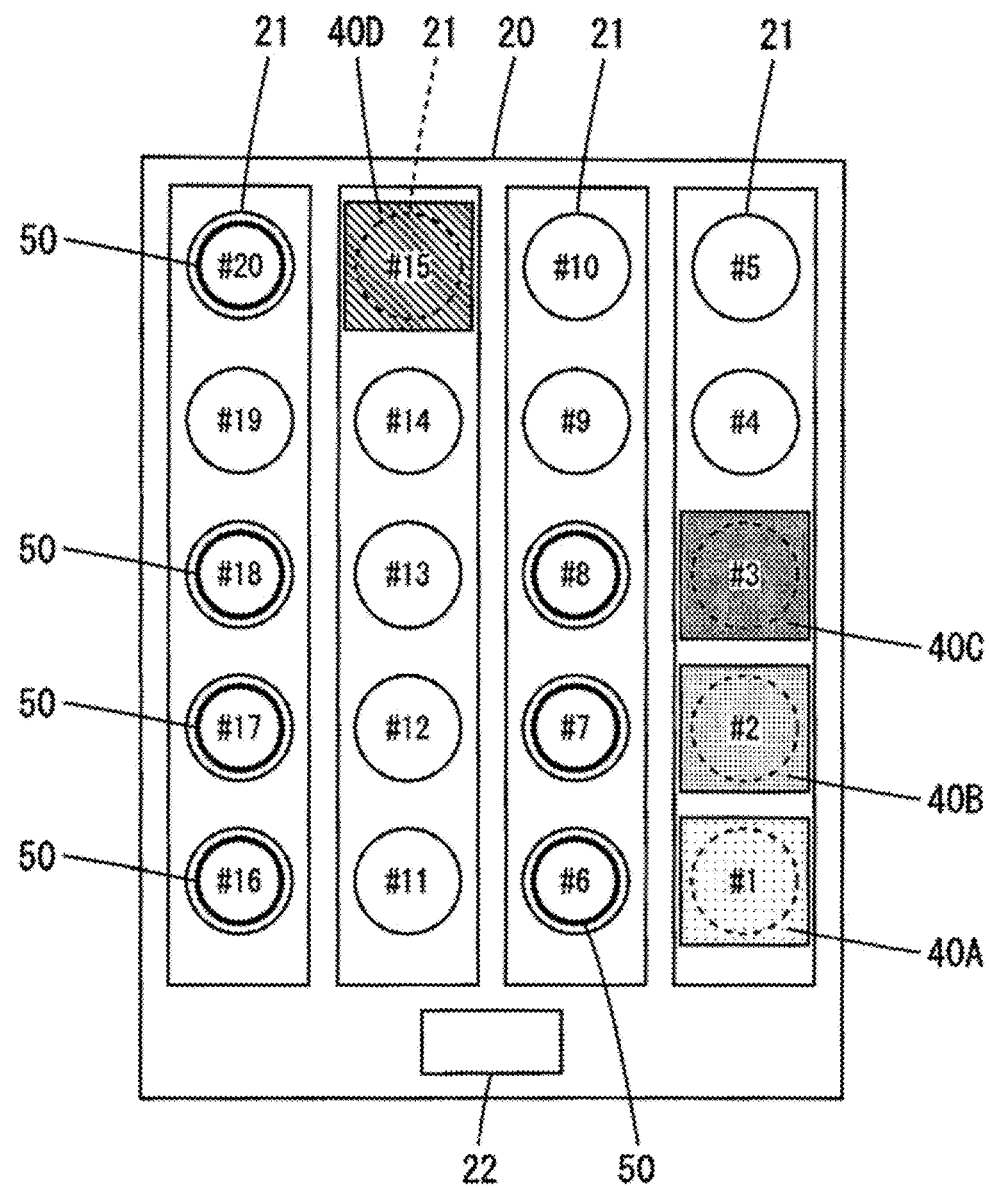
FIG. 19 is a diagram for explaining a use of a jig in a first modified example.

While a jig 40 is an attachment and attached to a container holder 21 in the present embodiment, the embodiment is not limited to this. FIG. 19 is a diagram for explaining a use of a jig 40 in a first modified example.

As shown in FIG. 19, twenty container holders 21 arranged in five rows and four columns are formed in a tray 20 in the first modified example similarly to the tray of FIG. 2. That is, first to fifth container holders 21 are arranged in the first column, and sixth to tenth container holders 21 are arranged in the second column. Further, eleventh to fifteenth container holders 21 are arranged in the third column, and sixteenth to twentieth container holders 21 are arranged in the fourth column.

In the present example, the container holders 21 in the first or third column are used to hold jigs 40. The container holders 21 in the second or fourth column are used to hold sample containers 50. Further, the first to fifth container holders 21 in the first column correspond to the sixth to tenth container holders 21 in the second column, respectively. The eleventh to fifteenth container holders 21 in the third column correspond to the sixteenth to twentieth container holders 21 in the fourth column, respectively.

Therefore, the user causes any of the container holders 21 in the second or fourth column to hold a desired sample container 50. Further, in a case where the sample stored in the sample container 50 is a standard sample or a control sample, the user causes the container holder 21 in the first or third column corresponding to the container holder 21 holding the sample container 50 to hold the jig 40 corresponding to the sample type.

In the example of FIG. 19, standard samples having the first to third concentrations are respectively held by the sixth to eighth container holders 21 in the second column. Therefore, jigs 40A to 40C are respectively held by the first to third container holders 21 in the first column. Further, first to third unknown samples are respectively held by the sixteenth to eighteenth container holders 21, and a control sample is held by the twentieth container holder 21, in the fourth column. Therefore, jigs 40 are not held by the eleventh to thirteenth container holders 21, and a jig 40D is held by the fifteenth container holder 21, in the third column.

The detector 230 of FIG. 6 detects whether a sample container 50 is held by each of the container holders 21 in the second or fourth column of the corresponding tray 20. Further, in a case where detecting a sample container 50 being held by any of the container holders 21, the detector 230 detects whether a jig 40 is held by a container holder 21 corresponding to the container holder 21 in the first or third column. Further, in a case where detecting a jig 40 being attached to the container holder 21, the detector 230 detects the height of the upper surface of the jig 40. The first analysis information specifier 12 of FIG. 7 specifies the type of the sample in the sample container 50 based on the detected height.

Figure 20:
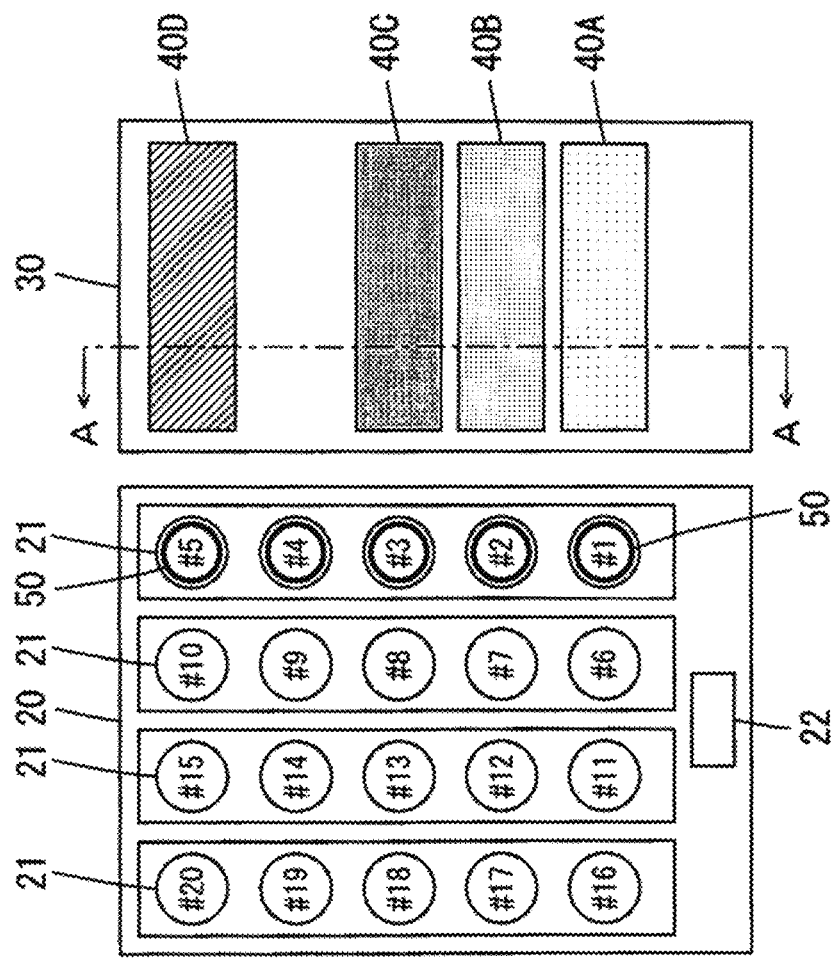
FIG. 20 is a diagram for explaining a use of a jig in a second modified example.
Figure 21:
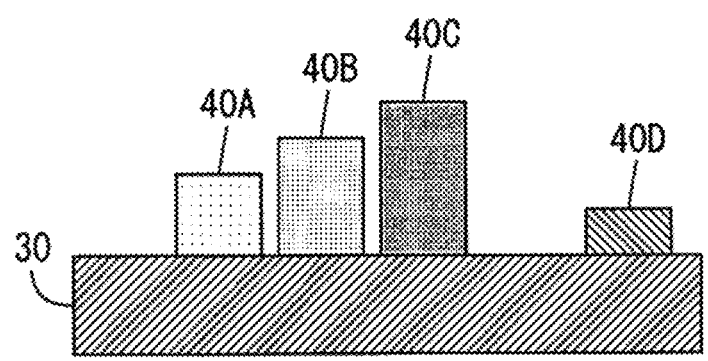
FIG. 21 is a cross sectional view taken along the line A-A of a jig placement table of FIG. 20.

FIG. 20 is a diagram for explaining a use of a jig 40 in a second modified example. FIG. 21 is a cross sectional view taken along the line A-A of a jig placement table 30 of FIG. 20. As shown in FIG. 20, the jig placement table 30 is provided to be adjacent to a tray 20 in the second modified example. Further, the tray 20 in the second modified example has the configuration similar to that of the tray 20 in the first modified example. A plurality of jigs 40 can be placed on the jig placement table 30 so as to respectively correspond to a plurality of container holders 21 in any column (the first column in the present example) of the tray 20.

In the examples of FIGS. 20 and 21, standard samples having first to third concentrations are respectively held by first to third container holders 21 in the first column of the tray 20. Further, an unknown sample is held by a fourth container holder 21. Further, a control sample is held by a fifth container holder 21. Therefore, jigs 40A to 40C are respectively placed on the jig placement table 30 so as to be adjacent to the first to third container holders 21. A jig 40D is placed on the jig placement table 30 so as to be adjacent to the fifth container holder 21. A jig 40 is not placed on an area on the jig placement table 30 adjacent to the fourth container holder 21.

The detector 230 of FIG. 6 detects whether a sample container 50 is held by each container holder 21 in the first column of the corresponding tray 20. Further, in a case where detecting a sample container 50 being held by any of the container holders 21, the detector 230 detects whether a jig 40 is placed on an area on the jig placement table 30 adjacent to the container holder 21. Further, in a case where detecting a jig 40 being placed on the jig placement table 30, the detector 230 detects the height of the upper surface of the jig 40. The first analysis information specifier 12 of FIG. 7 specifies the type of the sample in the sample container 50 based on the detected height.

(9) Effects

In the present embodiment, the user of the analysis system 400 causes any of the plurality of container holders 21 of the tray 20 to hold a sample container 50, and attaches the kind of the jig 40 to which the type of the sample in each sample container 50 is assigned to the sample container 50. Here, the jigs 40 have different colors and different shapes corresponding to the sample types. Therefore, when attaching a jig 40, the user can identify the kind of the jig 40 by visually checking the color of the jig 40 and easily select the kind of the jig 40 to which the desired sample type is assigned.

In the automatic sample injector 200, the tray ID of the tray 20 placed in the placement unit 210 is read by the tray reader 220. The tray ID notifier 264 notifies the data processor 100 of the tray ID read by the tray reader 220.

The detector 230 detects whether a sample container 50 is held by each container holder 21 of the tray 20. Further, the jig information corresponding to the container holder 21 that holds the sample container 50 is detected by the detector 230. The information notifier 266 notifies the data processor 100 of the result of detection by the detector 230 as the holding information. Further, the information notifier 266 notifies the data processor 100 of the jig information detected by the detector 230.

In the data processor 100, the pre-registration information representing the correspondence relationship between the analysis information and the tray ID is acquired by the second information acquirer 13. The tray ID is acquired from the automatic sample injector 200 by the tray ID acquirer 14. Based on the pre-registration information acquired by the second information acquirer 13, the analysis information corresponding to the tray ID acquired by the tray ID acquirer 14 is specified by the second analysis information specifier 15.

Further, the holding information and the jig information are acquired from the automatic sample injector 200 by the first information acquirer 11. Based on the jig information acquired by the first information acquirer 11, the type of the sample in the sample container 50 held by the corresponding container holder 21 is specified by the first analysis information specifier 12. Based on the holding information acquired by the first information acquirer 11, the sample type specified by the first analysis information specifier 12 and the analysis information specified by the second analysis information specifier 15, a batch file is created automatically by the batch file creator 16.

With this configuration, it is possible to create a batch file without performing an operation of inputting various information to the batch file creator 16. Further, the batch file needs to be edited for each analysis, thereby fitting the content of analysis of a sample. Even in such a case, the user replaces the jig 40 with the jig 40 corresponding to the container holder 21 such that the batch file fits the content of analysis, thereby being able to intuitively and flexibly edit the batch file without directly editing the batch file. As a result, a batch file can be created efficiently and without errors while a burden on the user is reduced.

Further, the user can flexibly change the analysis information for creating a batch file by changing the tray 20 placed in the placement unit 210 of the automatic sample injector 200. Therefore, the user can easily create the batch file corresponding to the desired analysis information in the data processor 100 by placing the tray 20 corresponding to the desired analysis information in the placement unit 210. Further, a calibration curve can be created based on the created batch file, and an unknown sample and a control sample can be analyzed.

(10) Other Embodiments (a) While the colors and shapes of the jigs 40 differ depending on the analysis information in the above-mentioned embodiment, the embodiment is not limited to this. Only the colors or only the shapes of the jigs 40 may differ depending on the analysis information. In a case where only the colors of the jigs 40 differ, the detector 230 may include a color sensor or a camera, for example.

Alternatively, in a case where the identification information such as an electronic tag, a barcode or a character corresponding to the analysis information is provided to the jig 40, the jigs 40 may have the same color and shape. In particular, the dimensions of the jig 40 can be easily increased in the second modified example, so that the above-mentioned identification information can be easily provided to the jig 40. In this configuration, the detector 230 includes an electronic tag reader, a barcode reader or a character recognition sensor.

(b) While the analysis information corresponding to the kinds of the jigs 40 is the sample type in the above-mentioned embodiment, the embodiment is not limited to this. The analysis information corresponding to the kinds of the jigs 40 may be another analysis information that desirably and flexibly changes for each analysis. Such analysis information may be a predetermined prefix ("beer_," "shochu_" or "sake_," for example) provided to the sample name, for example.

Alternatively, the above-mentioned analysis information may be whether the baseline of signal in a chromatograph is checked. In this case, it is possible to specify the analysis information by detecting only whether a jig 40 is attached to a sample container 50. Therefore, the number of kinds of the jigs 40 does not have to be two or more but may be one.

(c) While the jig 40 is attached to the lower end of the main body of the sample container 50 in the above-mentioned embodiment, the embodiment is not limited to this. The jigs 40 are vial caps having different traits (color or shape, for example) corresponding to the analysis information, and a jig 40 may be attached to the upper end of the main body of a sample container 50.

(d) While a batch file is automatically created by automatic specification of part of the analysis information corresponding to a jig 40 and another analysis information corresponding to a tray 20 in the above-mentioned embodiment, the embodiment is not limited to this. A batch file may be created by manual input of the other analysis information to the batch file creator 16 by a user. Even in this case, it is not necessary for the user to input part of the analysis information corresponding to the jig 40 to the batch file creator 16, so that a burden of creating a batch file for the user can be reduced.

(e) While the tray 20 is replaceably placed in the placement unit 210 in the above-mentioned embodiment, the embodiment is not limited to this. The tray 20 may be fixedly installed in the placement unit 210. In this case, because the tray ID of the tray 20 installed in each placement unit 210 is known, the automatic sample injector 200 does not have to include the tray reader 220.

(f) While the automatic sample injector 200 includes the plurality of placement units 210 in the above-mentioned embodiment, the embodiment is not limited to this. The automatic sample injector 200 may include only one placement unit 210.

(g) While the data processor 100 and the automatic sample injector 200 are provided separately in the above-mentioned embodiment, the embodiment is not limited to this. The data processor 100 and the automatic sample injector 200 may be provided integrally. In this case, the CPU 110 and the CPU 261 may be constituted by a common CPU, the RAM 120 and the RAM 262 may be constituted by a common RAM, and the ROM 130 and the ROM 263 may be constituted by a common ROM.

(h) While the tray 20 includes a container holder 21 that holds a sample via a sample container 50 or holds a sample via a jig 40 and a sample container 50 in the above-mentioned embodiment, the embodiment is not limited to this. The tray 20 may include a sample holder such as a well that directly holds a sample without a sample container 50 or holds a sample via a jig 40.

(11) Aspects (Item 1) A chromatograph data processor according to one aspect may be connected to an automatic sample injector by which a sample held by any of a plurality of sample holders may be introducible to a chromatograph, wherein first analysis information including at least one of a sample analysis condition, a sample preparation condition and a kind of sample may be assigned to at least one kind of a jig, and the jig may be arrangeable to correspond to any of the plurality of sample holders, and the chromatograph data processor may include a first information acquirer that acquires holding information representing whether a sample is held by each sample holder from the automatic sample injector and acquires jig information for identifying a kind of the jig from the automatic sample injector, a first analysis information specifier that specifies first analysis information in regard to a corresponding sample holder based on the jig information acquired by the first information acquirer, and a batch file creator that creates a batch file for controlling a sequence of analysis or preparation in regard to a sample held by the sample holder corresponding to the jig by using the holding information acquired by the first information acquirer and the first analysis information specified by the first analysis information specifier.

In this chromatograph data processor, first analysis information including at least one of a sample analysis condition, a sample preparation condition and a kind of sample is assigned to at least one kind of jig, and the jig is arrangeable to correspond to any of the plurality of sample holders. As such, the user causes any of the plurality of sample holders to hold a sample, and arranges the kind of the jig to which the first analysis information of each sample is assigned to correspond to the sample holder holding the sample.

In this case, the holding information representing whether a sample is held by each sample holder is acquired by the first information acquirer from the automatic sample injector. Further, the jig information for identifying the kind of jig is acquired by the first information acquirer from the automatic sample injector. The first analysis information in regard to the corresponding sample holder is specified by the first analysis information specifier based on the jig information acquired by the first information acquirer. A batch file for controlling the sequence of analysis or preparation in regard to the sample held by the sample holder corresponding to the jig is created by the batch file creator with use of the holding information acquired by the first information acquirer and the first analysis information specified by the first analysis information specifier.

With this configuration, the user can create a batch file without performing an operation of inputting the first analysis information to the data processor. Further, the batch file needs to be edited for each analysis, thereby fitting the content of analysis of a sample. Even in such a case, the user can replace the jig with the jig corresponding to the sample holder such that the batch file fits the content of analysis, thereby being able to edit the batch file intuitively and flexibly without directly editing the batch file. As a result, the batch file can be created while a burden on the user is reduced.

(Item 2) In the chromatograph data processor according to item 1, the first analysis information may include a sample type that distinguishes among a standard sample, an unknown sample and a control sample as a kind of a sample.

In this case, it is not necessary for the user to perform an operation of inputting a sample type that distinguishes among a standard sample, an unknown sample and a control sample to the data processor. This facilitates creation of a batch file for creating a calibration curve and analyzing an unknown sample and a control sample.

(Item 3) In the chromatograph data processor according to item 1 or 2, the plurality of sample holders may be provided in a tray, and the chromatograph data processor may include a second information acquirer that acquires pre-registration information representing a correspondence relationship between second analysis information representing a condition in regard to analysis or preparation of a sample and a tray ID (identifier) unique to the tray, a tray ID acquirer that acquires the tray ID from the automatic sample injector, and a second analysis information specifier that specifies second analysis information corresponding to the tray ID acquired by the tray ID acquirer based on the pre-registration information acquired by the second information acquirer, and the batch file creator may automatically create a batch file by further using the second analysis information specified by the second analysis information specifier.

In this case, a batch file is automatically created with further use of the second analysis information. Therefore, it is not necessary for the user to perform an operation of inputting various information for creating a batch file to the batch file creator. Therefore, no recognition error or operational error by the user occurs. Thus, a batch file can be created efficiently and without errors.

(Item 4) In the chromatograph data processor according to any one of items 1 to 3, a device controller that controls the automatic sample injector or the chromatograph based on the batch file created by the batch file creator such that the sample is analyzed or prepared may be included.

In this case, the result of analysis or the result of preparation of the sample can be easily acquired.

(Item 5) An automatic sample injector according to another aspect may be connected a chromatograph data processor and by which a sample held by any of a plurality of sample holders may be introducible to a chromatograph, wherein first analysis information including at least one of a sample analysis condition, a sample preparation condition and a kind of a sample may be assigned to at least one kind of a jig, and the jig may be arrangeable to correspond to any of the plurality of sample holders, and the automatic sample injector may include a holding detector that detects whether a sample is held by each sample holder, a jig detector that detects jig information corresponding to a sample holder holding a sample, and an information notifier that notifies the chromatograph data processor of a result of detection by the holding detector as holding information and notifies the chromatograph data processor of jig information detected by the jig detector.

In this automatic sample injector, the first analysis information including at least one of a sample analysis condition, a sample preparation condition and a kind of sample is assigned to at least one kind of jig, and the jig is arrangeable to correspond to any of the plurality of sample holders. As such, the user causes any of the plurality of sample holders to hold a sample, and arranges the kind of jig to which the first analysis information of each sample is assigned to correspond to the sample holder holding the sample.

In this case, whether a sample is held by each sample holder is detected by the holding detector. The jig information corresponding to the sample holder holding a sample is detected by the jig detector. The chromatograph data processor is notified of the result of detection by the holding detector as the holding information by the information notifier. Further, the chromatograph data processor is notified of the result of detection by the jig detector as the jig information by the information notifier. This facilitates creation of a batch file in the chromatograph data processor. As a result, a batch file can be created while a burden on the user is reduced.

(Item 6) In the automatic sample injector according to item 5, the at least one kind of a jig may include a plurality of kinds of jigs having different colors and different shapes corresponding to the first analysis information.

In this case, the user can identify the kind of jig by visually checking the color of the jig, and can easily select the kind of the jig to which the desired first analysis information is assigned. Further, the jig detector can easily detect the jig information by detecting the shape of the jig.

(Item 7) In the automatic sample injector according to items 5 or 6, the plurality of sample holders by which a sample container storing a sample may be holdable, and the jig may be an attachment attachable to a sample container held by a corresponding sample holder.

In this case, the user can easily arrange the attachment to correspond to the sample holder by attaching the attachment to the sample container held by the sample holder.

(Item 8) In the automatic sample injector according to one of items 5 to 7, the holding detector and the jig detector may be constituted by a common detector that detects whether a sample is held by each sample holder and detects jig information corresponding to a sample holder holding a sample.

In this case, it is not necessary to provide the holding detector separately from the jig detector. Thus, the manufacturing cost of the automatic sample injector can be reduced, and the size of the automatic sample injector can be reduced.

(Item 9) In the automatic sample injector according to one of items 5 to 8, the plurality of sample holders may be provided in a tray, and the automatic sample injector may further include a tray ID notifier that notifies the chromatograph data processor of a tray ID (identifier) that corresponds to second analysis information representing a condition in regard to analysis or preparation of a sample and is unique to the tray.

In this case, a batch file can be created easily and automatically based on the tray ID in the chromatograph data processor. Thus, a batch file can be created efficiently and without errors.

(Item 10) In the automatic sample injector according to item 9, a placement unit in which the tray is placed to be replaceable, and a tray reader that reads a tray ID of the tray placed in the placement unit, may further be included, wherein the tray ID notifier may notify the chromatograph data processor of the tray ID read by the tray reader.

In this case, it is possible to flexibly change the second analysis information for creating the batch file by changing the tray placed in the placement unit. Therefore, the user can easily create the batch file corresponding to the desired second analysis information in the chromatograph data processor by placing the tray corresponding to the desired second analysis information in the placement unit.

While preferred embodiments of the present invention have been described above, it is to be understood that variations and modifications will be apparent to those skilled in the art without departing the scope and spirit of the present invention. The scope of the present invention, therefore, is to be determined solely by the following claims.

I claim:

1. A chromatograph data processor connected to an automatic sample injector by which a sample held by any of a plurality of sample holders is introducible to a chromatograph, each of the plurality of sample holders including an opening having a depth configured to hold a sample container; wherein first analysis information including at least one of a sample analysis condition, a sample preparation condition and a kind of sample is assigned to at least one kind of a jig, and the jig is arrangeable to correspond to any of the plurality of sample holders, and the chromatograph data processor includes a first information acquirer that acquires holding information representing whether a sample is held by each sample holder from the automatic sample injector and acquires jig information for identifying a kind of the jig from the automatic sample injector, a first analysis information specifier that specifies first analysis information in regard to a corresponding sample holder based on the jig information acquired by the first information acquirer, and a batch file creator that creates a batch file for controlling a sequence of analysis or preparation in regard to a sample held by the sample holder corresponding to the jig by using the holding information acquired by the first information acquirer and the first analysis information specified by the first analysis information specifier.

2. The chromatograph data processor according to claim 1, wherein the first analysis information is the kind of sample, and the kind of sample is one of a standard sample, an unknown sample and a control sample.

3. The chromatograph data processor according to claim 1, wherein the plurality of sample holders are provided in a tray, and the chromatograph data processor includes a second information acquirer that acquires pre-registration information representing a correspondence relationship between second analysis information representing a condition in regard to analysis or preparation of a sample and a tray ID unique to the tray,
a tray ID acquirer that acquires the tray ID from the automatic sample injector, and
a second analysis information specifier that specifies second analysis information corresponding to the tray ID acquired by the tray ID acquirer based on the pre-registration information acquired by the second information acquirer, and
the batch file creator automatically creates a batch file by further using the second analysis information specified by the second analysis information specifier.

4. The chromatograph data processor according to claim 1, further comprising a device controller that controls the automatic sample injector or the chromatograph based on the batch file created by the batch file creator such that the sample is analyzed or prepared.

5. An automatic sample injector connected to a chromatograph data processor and by which a sample held by any of a plurality of sample holders is introducible to a chromatograph, each of the plurality of sample holders including an opening having a depth configured to hold a sample container; wherein
first analysis information including at least one of a sample analysis condition, a sample preparation condition and a kind of sample is assigned to at least one kind of a jig, and the jig is arrangeable to correspond to any of the plurality of sample holders, and
the automatic sample injector includes
a holding detector that detects whether a sample is held by each sample holder of the plurality of sample holders,
a jig detector that detects jig information corresponding to a sample holder of the plurality of sample holders holding the sample, and
an information notifier that notifies the chromatograph data processor of a result of detection by the holding detector as holding information and notifies the chromatograph data processor of jig information detected by the jig detector.

6. The automatic sample injector according to the claim 5, wherein the at least one kind of a jig includes a plurality of kinds of jigs having different colors and different shapes corresponding to the first analysis information.

7. The automatic sample injector according to claim 5, wherein
the plurality of sample holders by which sample containers storing samples are holdable, and
the jig is an attachment attachable to a sample container held by a corresponding sample holder.

8. The automatic sample injector according to claim 5, wherein
the holding detector and the jig detector are constituted by a common detector that detects whether a sample is held by each sample holder and detects jig information corresponding to a sample holder holding a sample.

9. The automatic sample injector according to claim 5, wherein
the plurality of sample holders are provided in a tray, and
the automatic sample injector further includes a tray ID notifier that notifies the chromatograph data processor of a tray ID that corresponds to second analysis information representing a condition in regard to analysis or preparation of a sample and is unique to the tray.

10. The automatic sample injector according to claim 9, further comprising
a placement unit in which the tray is placed to be replaceable, and
a tray reader that reads a tray ID of the tray placed in the placement unit, wherein
the tray ID notifier notifies the chromatograph data processor of the tray ID read by the tray reader.

* * * * *